(12) United States Patent
Seo et al.

(10) Patent No.: US 10,623,029 B2
(45) Date of Patent: Apr. 14, 2020

(54) METHOD AND ELECTRONIC DEVICE FOR DYNAMICALLY CHANGING GROUND POINTS OF A PLURALITY OF ANTENNAS OF THE ELECTRONIC DEVICE

(71) Applicant: Samsung Electronics Co., Ltd., Gyeonggi-do (KR)

(72) Inventors: Min Cheol Seo, Seoul (KR); Him Chan Yun, Gyeonggi-do (KR); Ho Jung Nam, Gyeonggi-do (KR); Joon Ho Byun, Gyeonggi-do (KR); Yoon Jae Lee, Gyeonggi-do (KR); Jong Hyuck Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/103,440

(22) Filed: Aug. 14, 2018

(65) Prior Publication Data
US 2019/0052292 A1 Feb. 14, 2019

(30) Foreign Application Priority Data
Aug. 14, 2017 (KR) .................. 10-2017-0102872

(51) Int. Cl.
*H04B 1/00* (2006.01)
*H01Q 5/371* (2015.01)
(Continued)

(52) U.S. Cl.
CPC .......... *H04B 1/0064* (2013.01); *H01Q 1/243* (2013.01); *H01Q 1/38* (2013.01); *H01Q 1/48* (2013.01);
(Continued)

(58) Field of Classification Search
None
See application file for complete search history.

(56) References Cited

U.S. PATENT DOCUMENTS 6,771,223 B1    8/2004  Shoji et al.
7,616,158 B2   11/2009  Mak et al.
(Continued)

FOREIGN PATENT DOCUMENTS

KR    20170098107    8/2017
KR    20180013615    2/2018
(Continued)

OTHER PUBLICATIONS

International Search Report dated Dec. 4, 2018 issued in counterpart application No. PCT/KR2018/009309, 3 pages.
(Continued)

*Primary Examiner* — Mohammed Rachedine
(74) *Attorney, Agent, or Firm* — The Farrell Law Firm, P.C.

(57) ABSTRACT

An electronic device is provided and includes a housing, a support member including a first ground region, a printed circuit board including a second ground region, a plurality of switches electrically connecting the first ground region and the second ground region, a first antenna element including at least a portion of a first edge of the housing and electrically connected with the first ground region of the support member, a second antenna element including at least a portion of a second edge of the housing and electrically connected with the second ground region of the printed circuit board, and a wireless communication circuit configured to transmit/receive in a first frequency band based on a first electrical path, transmit/receive in a second frequency band based on a second electrical path, set ON/OF states of the plurality of switches to a first arrangement and a second arrangement, wherein at least one switch of the plurality of switches is set to an ON state in each of the first arrangement and the second arrangement.

16 Claims, 21 Drawing Sheets

(51) Int. Cl.
- *H01Q 5/30* (2015.01)
- *H04B 1/3827* (2015.01)
- *H01Q 9/04* (2006.01)
- *H01Q 1/38* (2006.01)
- *H01Q 1/24* (2006.01)
- *H01Q 1/48* (2006.01)
- *H01Q 5/378* (2015.01)
- *H01Q 21/00* (2006.01)
- *H01Q 21/28* (2006.01)

(52) U.S. Cl.
CPC .............. *H01Q 5/30* (2015.01); *H01Q 5/371* (2015.01); *H01Q 5/378* (2015.01); *H01Q 9/0421* (2013.01); *H01Q 21/0025* (2013.01); *H04B 1/3838* (2013.01); *H01Q 9/0442* (2013.01); *H01Q 21/28* (2013.01)

(56) References Cited

U.S. PATENT DOCUMENTS

| | | |
|---|---|---|
| 9,257,738 B2 | 2/2016 | Lim et al. |
| 9,711,841 B2 | 7/2017 | Yong |
| 9,755,298 B2 | 9/2017 | Choi et al. |
| 9,972,891 B2 | 5/2018 | Ayala Vazquez et al. |
| 10,153,539 B2 | 12/2018 | Seo et al. |
| 2007/0273606 A1 | 11/2007 | Mak et al. |
| 2012/0098712 A1 | 4/2012 | Ishibana et al. |
| 2013/0090072 A1 | 4/2013 | Lim et al. |
| 2013/0285873 A1* | 10/2013 | Dupuy ................... H01Q 21/30 343/852 |
| 2014/0327579 A1* | 11/2014 | Hart ..................... H04W 64/006 342/374 |
| 2014/0370827 A1* | 12/2014 | Nakamura ............. H04B 1/006 455/78 |
| 2015/0084817 A1 | 3/2015 | Yong |
| 2016/0197396 A1 | 7/2016 | Choi et al. |
| 2016/0254590 A1 | 9/2016 | Seo et al. |
| 2016/0276742 A1 | 9/2016 | Yu et al. |
| 2017/0040668 A1 | 2/2017 | Ayala Vazquez et al. |
| 2017/0047640 A1 | 2/2017 | Choi et al. |
| 2017/0244163 A1 | 8/2017 | Yoo et al. |
| 2017/0311330 A1* | 10/2017 | Gandhi ............... H04W 72/082 |
| 2018/0034148 A1 | 2/2018 | Nam et al. |
| 2018/0139077 A1* | 5/2018 | Amizur ................ H04B 1/0064 |
| 2018/0337697 A1 | 11/2018 | Kim et al. |

FOREIGN PATENT DOCUMENTS

| | | |
|---|---|---|
| WO | WO 2017/099383 | 6/2017 |
| WO | WO 2018021888 | 2/2018 |

OTHER PUBLICATIONS

European Search Report dated Jan. 16, 2019 issued in counterpart application No. 18189015.3-1205, 9 pages.

* cited by examiner

METHOD AND ELECTRONIC DEVICE FOR DYNAMICALLY CHANGING GROUND POINTS OF A PLURALITY OF ANTENNAS OF THE ELECTRONIC DEVICE

CROSS-REFERENCE TO RELATED APPLICATION(S)

This application is based on and claims priority under 35 U.S.C. § 119(a) to Korean Patent Application Serial No. 10-2017-0102872, which was filed on Aug. 14, 2017, in the Korean Intellectual Property Office, the entire disclosure of which is incorporated herein by reference.

BACKGROUND

1. Field

The present disclosure relates, generally, to an electronic device including a plurality of antennas, and more particularly, to a method and electronic device for dynamically changing ground points of a plurality of antennas of the electronic device through switching.

2. Description of Related Art

An electronic device, which is equipped with an antenna, such as a smartphone, a wearable device, or the like are in high demand as mobile communication technologies develop. The electronic device may communicate with any other electronic device (e.g., a base station or a personal computer) through the antenna. The electronic device may communicate with any other electronic device through a multiple-input multiple-output (MIMO) system which multiplies the capacity of a channel in proportion to the number of antennas used. The electronic device may transmit/receive signals in multiple frequency bands through the MIMO system.

When communicating with any other electronic device, with the number of antennas increased, a parasitic current may be generated depending on an antenna structure. For example, a top antenna and a bottom antenna may share a ground region through a plurality of points, which may be fixed points. The top antenna and the bottom antenna may transmit/receive signals in multiple frequency bands, and since the plurality of points are fixed, a parasitic current may flow through the plurality of points in a specific frequency band. The parasitic current may cause a decrease in the rate at which the top antenna and the bottom antenna transmit/receive signals, making it nearly impossible or difficult for the electronic device to communicate with any other electronic device.

SUMMARY

The disclosure has been made to address at least the disadvantages described above and to provide at least the advantages described below. Accordingly, an aspect of the disclosure is to provide a method and an electronic device for reducing an influence of a parasitic current by dynamically changing ground points of a plurality of antennas.

In accordance with an aspect of the disclosure, there is provided an electronic device. The electronic device includes a housing, a display, a first ground plane, a second ground plane, wherein the second ground plane is at least partially overlapped with the first ground plane, a first antenna element electrically connected with the first ground plane, a second antenna element electrically connected with the second ground plane, at least one wireless communication circuit electrically connected with the first antenna element and the second antenna element, and at least one switching element electrically connecting the first ground plane and the second ground plane.

In accordance with an aspect of the disclosure, there is provided an electronic device. The electronic device includes a housing, a support member positioned within the housing and including a first ground region, a printed circuit board positioned inside the housing and including a second ground region, a plurality of switches electrically connecting the first ground region and the second ground region at a plurality of points, a first antenna element electrically connected with the first ground region of the support member, a second antenna element electrically connected with the second ground region of the printed circuit board, and a wireless communication circuit positioned within the housing and configured to transmit/receive a signal in a first frequency band based on at least one of a first electrical path formed through the first antenna element and a second electrical path formed through the second antenna element, set ON/OF states of the plurality of switches to a first arrangement while the signal in the first frequency band is transmitted/received, set the ON/OF states of the plurality of switches to a second arrangement for the purpose of transmitting/receiving the signal in the second frequency band, and transmit/receive the signal in the second frequency band based on at least one of the first electrical path and the second electrical path when the ON/OFF states of the plurality of switches are set to the second arrangement, wherein at least one switch of the plurality of switches is set to an ON state in each of the first arrangement and the second arrangement.

In accordance with an aspect of the disclosure, there is provided an electronic device. The electronic device includes a housing, a support member positioned within the housing and including a first ground region, a printed circuit board positioned inside the housing and including a second ground region, a plurality of switches electrically connecting the first ground region and the second ground region at a plurality of points, a first antenna element electrically connected with the first ground region of the support member, a second antenna element electrically connected with the second ground region of the printed circuit board, and a wireless communication circuit positioned within the housing and configured to transmit/receive a signal in a first frequency band based on a first electrical path formed through the first antenna element, transmit/receive a signal in a second frequency band based on a second electrical path formed through the second antenna element, set ON/OF states of the plurality of switches to a first arrangement while the signal in the first frequency band is transmitted/received, and set the ON/OF states of the plurality of switches to a second arrangement while the signal in the second frequency band is transmitted/received, wherein at least one switch of the plurality of switches is set to an ON state in each of the first arrangement and the second arrangement.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
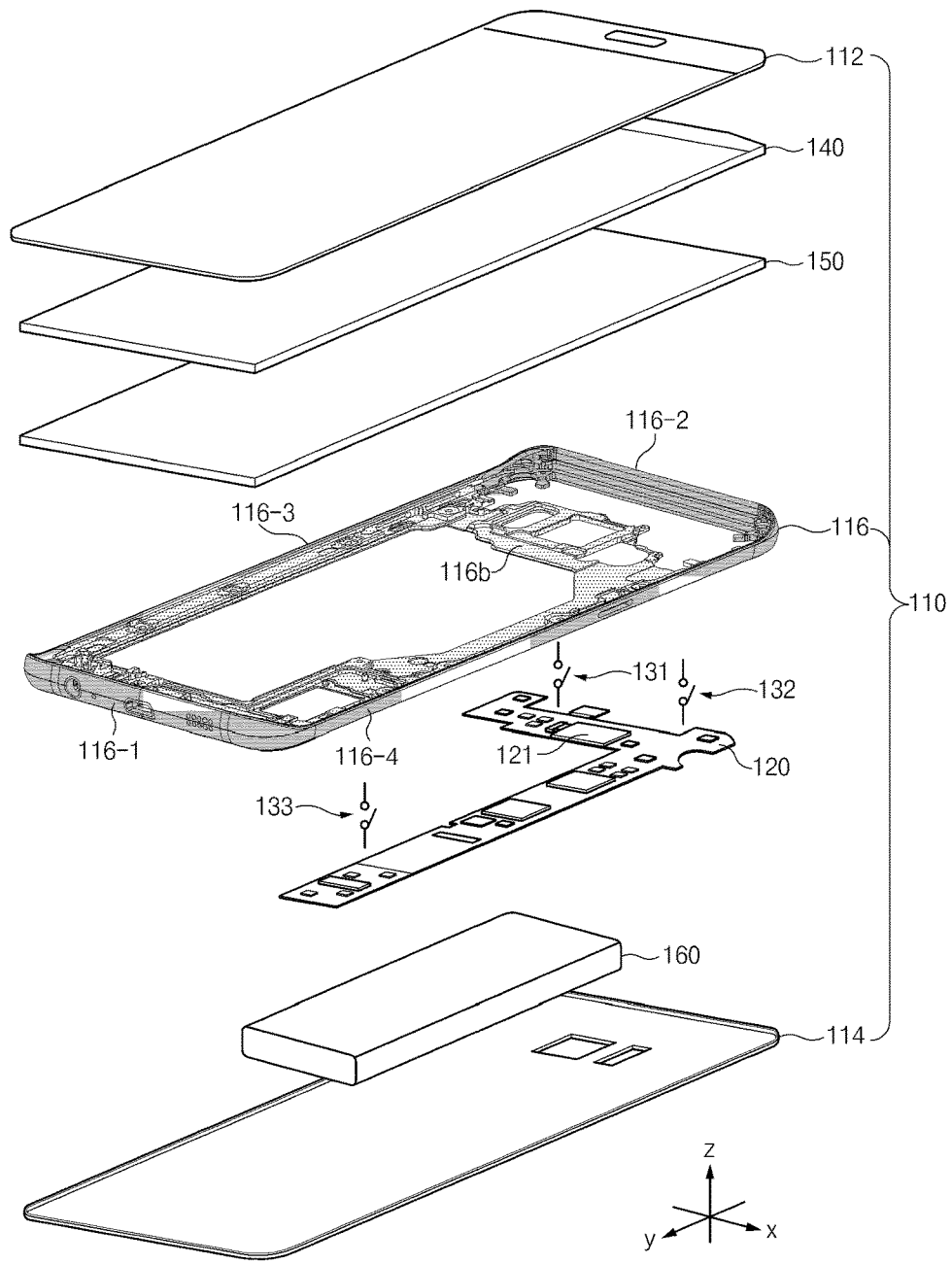
FIG. 1 is diagram of an electronic device, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

FIG. 1 is diagram of an electronic device, according to an embodiment.

Referring to FIG. 1, an electronic device 100 may include a housing 110, a printed circuit board 120, a plurality of switches 131, 132, and 133, a display 140, a shield layer 150, and a battery 160.

The housing 110 may form the exterior of the electronic device 100, and the housing 110 may include a first surface, a second surface facing away from the first surface, and a side member 116 surrounding a space between the first surface and the second surface. The first surface may be the exterior of the electronic device 100 in a positive z-direction, and the second surface may form the exterior of the electronic device 100 in a negative z-direction. The side member 116 may form the exterior of the electronic device 100 in a positive x-direction, a negative x-direction, a positive y-direction, and a negative y-direction.

The first surface may be referred to as a cover glass 112. The cover glass 112 may transmit light generated by the display 140. A user may touch a portion (e.g., a finger) of his/her body on the cover glass 112 to perform a touch (including a contact using an electronic pen). The cover glass 112 may be made from tempered glass, reinforced plastic, a flexible polymer material, or the like, and may protect the display 140 and each component included in the electronic device 100 from an external shock.

The second surface may be referred to as a rear cover 114. The rear cover 114 may be coupled to the electronic device 100 to protect various parts positioned within the electronic device 100 from an external shock. The rear cover 114 may be an integral part of the side member 116 of the electronic device 100, or may be removed by the user. The rear cover 114 may be made from tempered glass, plastic, and/or metal.

The side member 116 may include a first side 116-1 (or a first edge), a second side 116-2 (or a second edge), a third side 116-3 (or a third edge), and a fourth side 116-4 (or a fourth edge). The first side 116-1 may face a first direction (e.g., the positive x-direction or the negative x-direction) and may have a first length. The second side 116-2 may extend parallel to the first side 116-1 and may have the first length. The third side 116-3 may connect one end of the first side 116-1 and one end of the second side 116-2. The fourth side 116-4 may extend parallel to the third side 116-3 and may connect an opposite end of the first side 116-1 and an opposite end of the second side 116-2.

A support member 116b (e.g., a bracket) may be positioned within a space surrounded by the first side 116-1 to the fourth side 116-4. The support member 116b may form at least a portion of the side member 116 or may be connected with the side member 116. The support member 116b may extend from the third side 116-3 and may be connected with the fourth side 116-4.

At least a portion of the support member 116b may be made from or include a metal material. Since the at least a portion of the support member 116b is formed of a metal material, various electronic parts (e.g., an antenna) included in the electronic device 100 may be grounded to the support member 116b. The support member 116b may be formed of magnesium alloy, and a current supplied to the antenna may flow to the support member 116b. A portion, which is formed of a metal material, of the support member 116b may be referred to as a first ground region (e.g., a first ground region 250 of FIG. 2C).

The printed circuit board 120 may be interposed/disposed between the support member 116b and the rear cover 114. Various electronic parts (e.g., a wireless communication circuit 121, a memory, and the like) of the electronic device 100 may be mounted or arranged on the printed circuit board 120. The printed circuit board 120 may be also referred to as a main board or printed board assembly (PBA).

The printed circuit board 120 may include a plurality of layers. At least one of the plurality of layers may be formed of a metal material. Various electronic parts (e.g., an antenna) included in the electronic device 100 may be grounded to a layer (a second ground region) formed of the metal material. In other words, a current supplied to an antenna may flow to the second ground region (e.g., a second ground region 260 of FIG. 2C).

The plurality of switches 131, 132, and 133 may be arranged on the printed circuit board 120, and the plurality of switches 131, 132, and 133 may electrically connect the first ground region and the second ground region at a plurality of points. When the switches 131, 132, and 133 are on (or set to ON), the first ground region and the second ground region may be electrically connected at a plurality of points. In contrast, when the switches 131, 132, and 133 are off (or set to OFF), the connection between the first ground region and the second ground region may be cut off.

Operation of the switches 131, 132, and 133 may be independent of each other. For example, the first switch 131 and the second switch 132 may be on, and the third switch 133 may be off. The first ground region and the second ground region may be electrically connected through the first switch 131 and the second switch 132. That a switch is on may be referred to as a state in which the first ground region and the second ground region are electrically connected as the switch is closed (or short-circuited). In contrast, that a switch is off may be referred to as a state in which the first ground region and the second ground region are not electrically connected as the switch is opened.

The wireless communication circuit 121 may be electrically connected with a first antenna element and a second antenna element through a specified wiring (e.g., a flexible printed circuit board (FPCB)). The first antenna element which is a portion of the first side 116-1 may be electrically connected with the first ground region. The second antenna element which is a portion of the second side 116-2 may be electrically connected with the second ground region.

The wireless communication circuit 121 may feed the first antenna element and the second antenna element. Feed or feeding may refer to an operation in which the wireless communication circuit 121 applies a current to the first antenna element and the second antenna element.

Since the first antenna element is electrically connected with the first ground region, a current fed to the first antenna element may flow to the first ground region. Since the second antenna element is electrically connected with the second ground region, a current fed to the second antenna element may flow to the second ground region. When the first ground region and the second ground region are connected through the switches 131, 132, and 133, a feeding current of the first antenna element flowing to the first ground region may flow through the second ground region. A feeding current of the second antenna element flowing to the second ground region may flow through the first ground region.

When the wireless communication circuit 121 feeds the first antenna element, the electronic device 100 may transmit/receive a signal in a first frequency band through a first electrical path formed through the first antenna element. When the wireless communication circuit 121 feeds the second antenna element, the electronic device 100 may transmit/receive a signal in a second frequency band through a second electrical path formed through the second antenna element. A description is given above as the electronic device 100 transmits/receives signals in different frequency bands through the first electrical path and the second electrical path, but the electronic device 100 may transmit/receive signals in the same frequency band. The first electrical path formed through the first antenna element may be referred to as a bottom antenna, and the second electrical path formed through the second antenna element may be referred to as a top antenna.

The display 140 may be interposed between the side member 116 and the cover glass 112. The display 140 may be electrically connected with the printed circuit board 120, and may output content (e.g., a text, an image, a video, an icon, a widget, a symbol, or the like) or may receive a touch input (e.g., a touch, a gesture, or the like) from the user. A thin film sheet or a plate which is formed of copper (Cu) or graphite may be positioned on a rear surface of the display 140.

The shield layer 150 may be interposed between the display 140 and the side member 116. The shield layer 150 may shield an electro-magnetic wave generated between the display 140 and the printed circuit board 120 to prevent an electro-magnetic interference between the display 140 and the printed circuit board 120.

The shield layer 150 may include a thin film sheet or a plate which is formed of copper (Cu) or graphite. When the shield layer 150 is formed of copper (Cu) or graphite, components included in the electronic device 100 may be grounded to the shield layer 150.

The battery 160 may convert chemical energy and electrical energy bidirectionally. The battery 160 may convert chemical energy into electrical energy and may supply the electrical energy to the display 140 and various components or modules mounted on the printed circuit board 120. Alternatively, the battery 160 may convert and store electrical energy from the outside into chemical energy. A power management module for managing the charging and discharging of the battery 160 may be included in the printed circuit board 120.

Figure 2A:
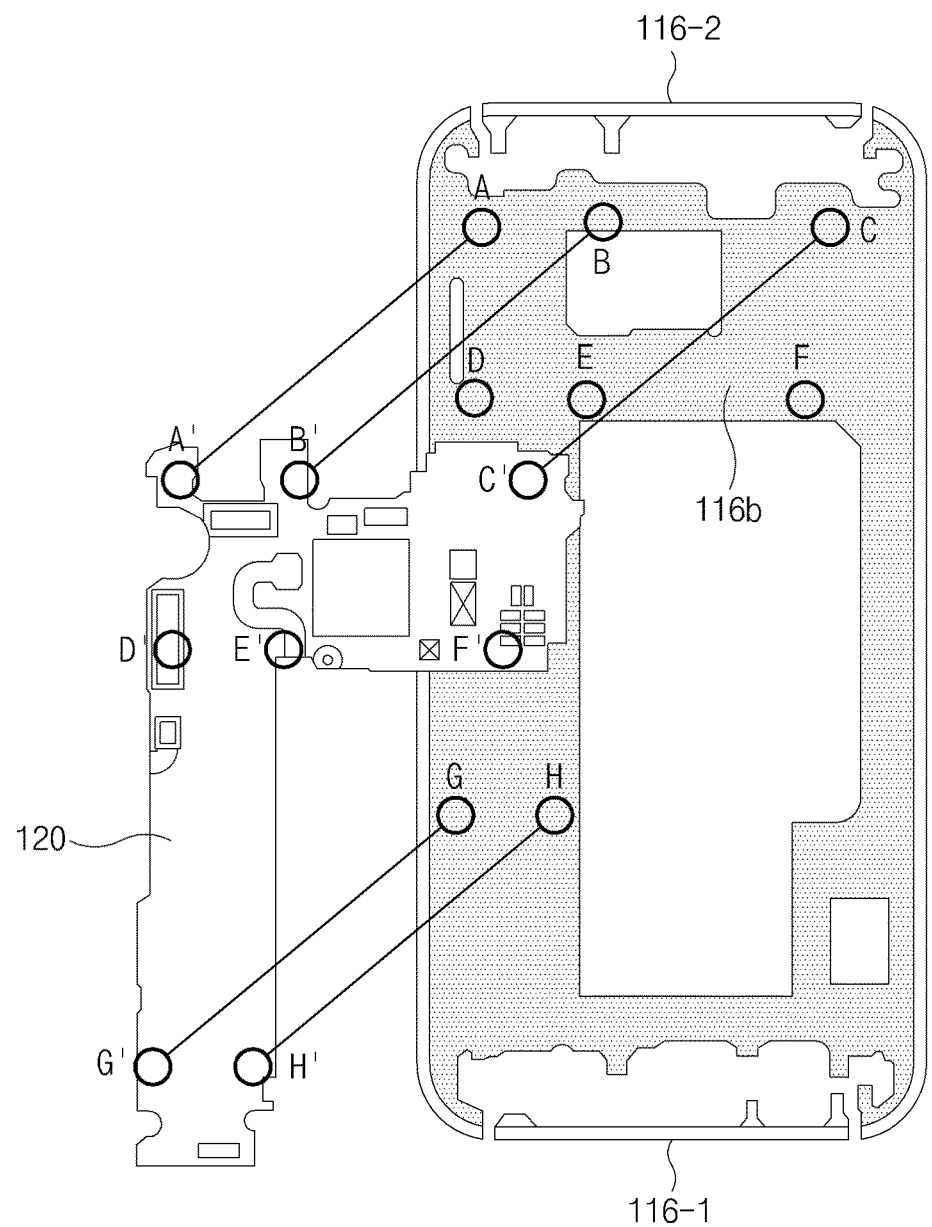
FIG. 2A is a diagram of connection points disposed on a support member and a printed circuit board, according to an embodiment.

FIG. 2A is a diagram of points disposed on a support member and a printed circuit board, according to an embodiment. In FIG. 2A, a point A to a point H may be included in the first ground region described with reference to FIG. 1, and a point A' to a point H' may be included in the second ground region described with reference to FIG. 1.

Figure 2B:
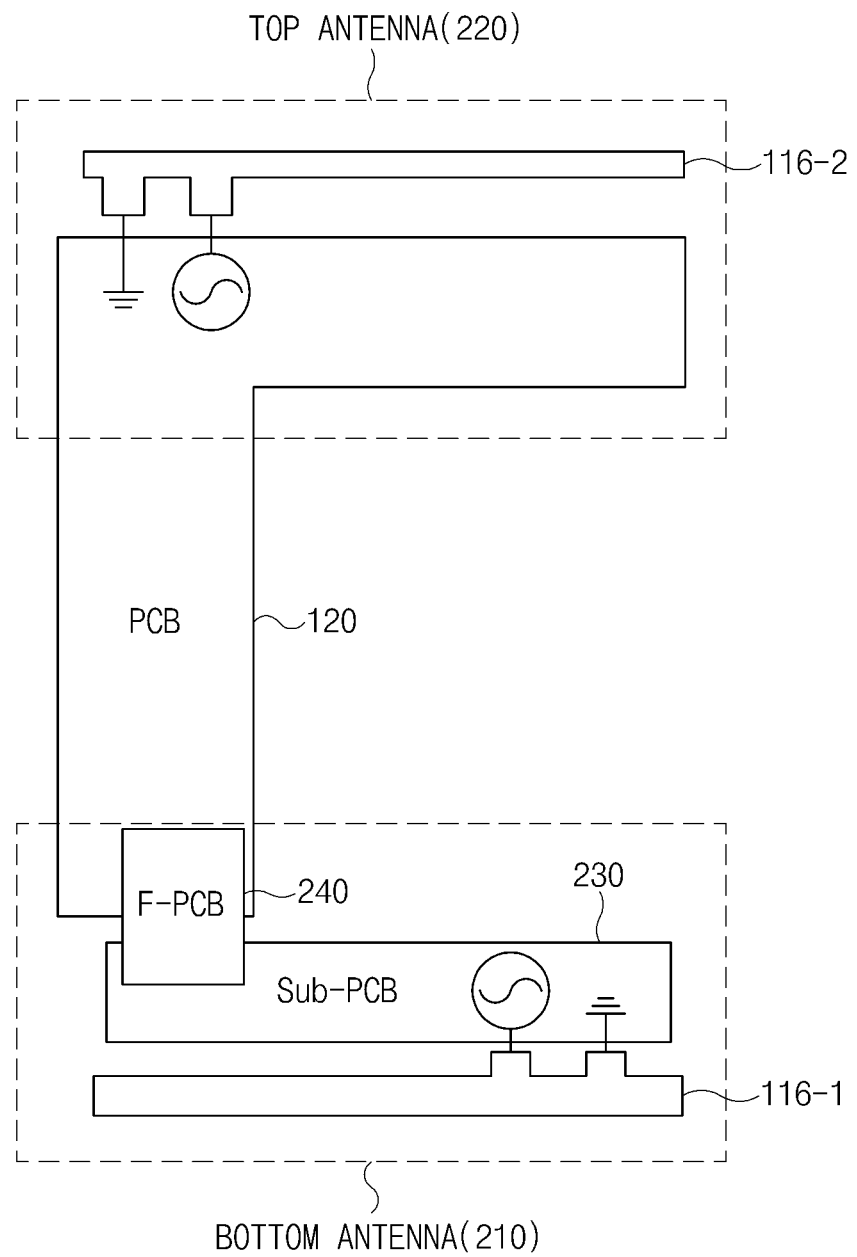
FIG. 2B is a diagram of a bottom antenna and a top antenna that are connected with a printed circuit board, according to an embodiment.

FIG. 2B is a diagram of a bottom antenna and a top antenna that are connected with a printed circuit board, according to an embodiment.

Figure 2C:
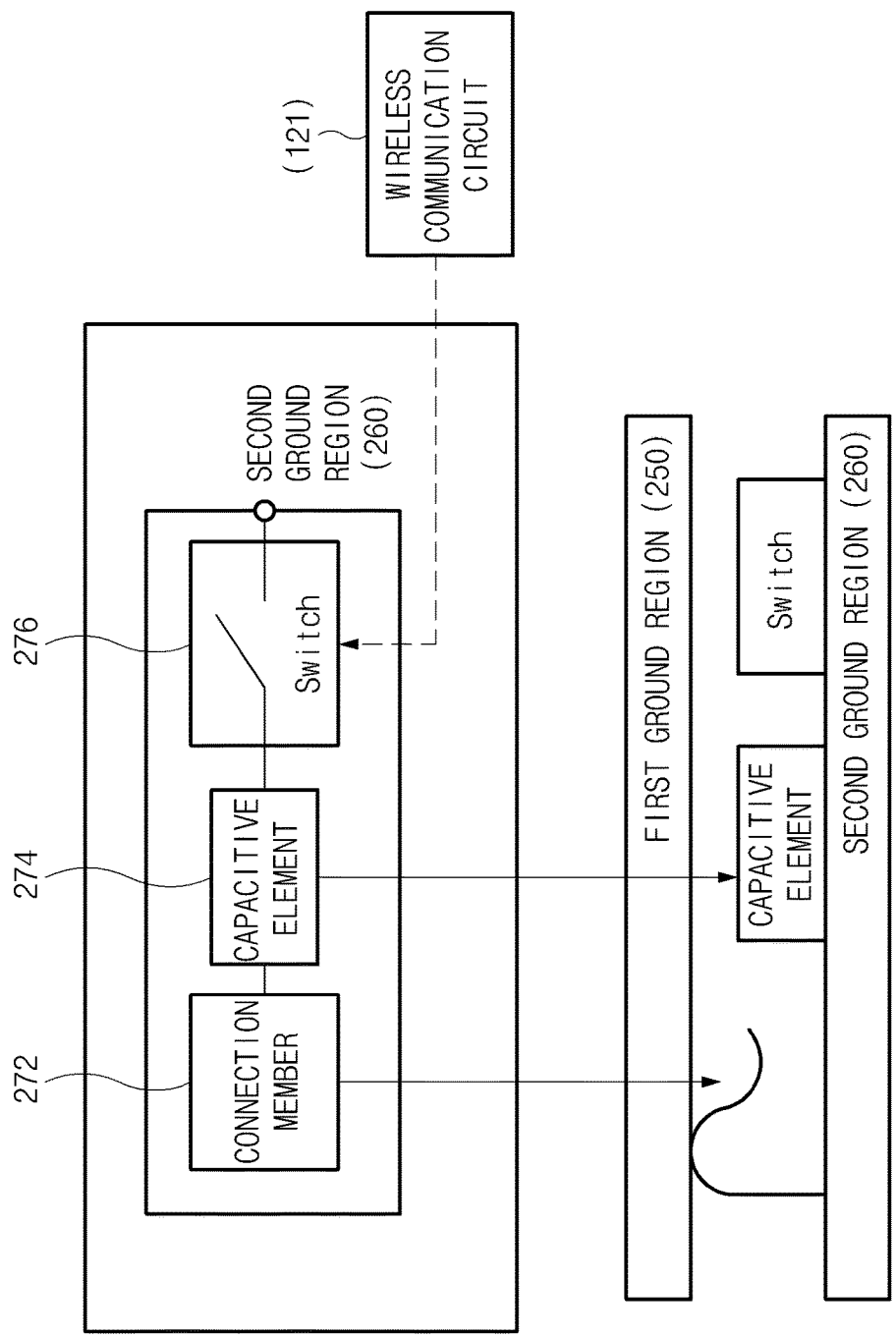
FIG. 2C is a diagram of a point connecting a first ground region and a second ground region, according to an embodiment.

FIG. 2C is a diagram of a point connecting a first ground region and a second ground region, according to an embodiment. A point illustrated in FIG. 2C may be any one of the point A' to the point H' illustrated in FIG. 2A.

Figure 2D:
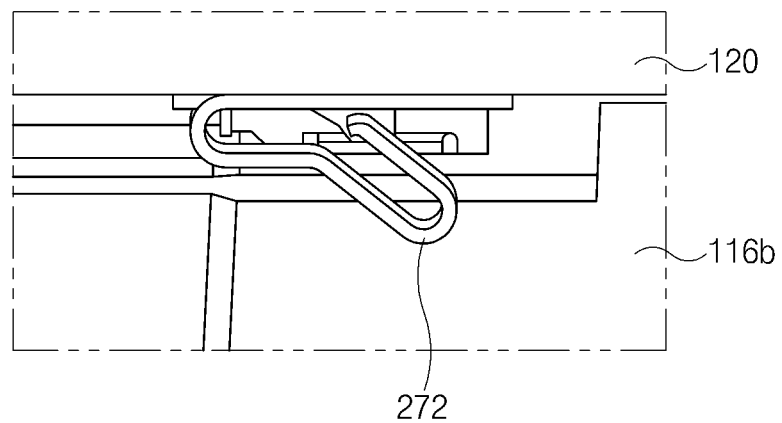
FIG. 2D is a diagram of a printed circuit board and a support member, according to an embodiment.

FIG. 2D is a diagram of a printed circuit board and a support member, according to an embodiment.

Referring to FIG. 2A, the support member 116b and the printed circuit board 120 may be connected through a plurality of points. A plurality of switches may be arranged on the printed circuit board 120. Each of the plurality of switches may connect the first ground region of the support member 116b and the second ground region of the printed circuit board 120. A first switch may electrically connect the point A on a first region and the point A' on a second region. The point B to the point H may be electrically connected with the point B' to the point H' through a second switch to an eighth switch, respectively.

Referring to FIG. 2B, the electronic device 100 may include a sub-printed circuit board (sub-PCB) 230 and a flexible printed circuit board (F-PCB) 240. The sub-printed circuit board 230 may include a plurality of layers, and any one of the plurality of layers may correspond to a layer (hereinafter referred to as a third ground region) formed of a metal material. The flexible printed circuit board 240 may electrically connect the printed circuit board 120 and the sub-printed circuit board 230. The flexible printed circuit board 240 may electrically connect the second ground region (e.g., 260 of FIG. 2C) on the printed circuit board 120 and the third ground region on the sub-printed circuit board 230.

A bottom antenna 210 may be electrically connected with the third ground region. Since the flexible printed circuit board 240 electrically connects the second ground region 260 and the third ground region, the bottom antenna 210 may be electrically connected with the support member 116b (or the first ground region (e.g., 250 of FIG. 2C) through the third ground region and the second ground region 260. Accordingly, a current fed to the bottom antenna 210 may flow to the support member 116b through the third ground region and the second ground region 260.

A top antenna 220 may be electrically connected with the second ground region 260. Accordingly, a current fed to the top antenna 220 may flow to the support member 116b through the second ground region 260.

Referring to FIGS. 2C and 2D, a connection member 272 (e.g., C-clip), a capacitive element 274 (e.g., a capacitor), and a switch 276 (e.g., a single-pole, double-throw (SPDT) switch or a single-pole, four-position (SP4P) switch) may be arranged on the printed circuit board 120. The switch 276 illustrated in FIG. 2C may be any one of the switches 131, 132, and 133 illustrated in FIG. 1.

The connection member 272 may selectively connect the first ground region 250 and the second ground region 260. The connection member 272 may be formed of a conductive material such as a C-clip, a conductive foam spring, a screw, a solder, or the like.

The capacitive element 274 may prevent an electric shock when a user's body directly contacts the electronic device 100. The capacitive element 274 may prevent the electric shock by cutting off the connection between the first ground region 250 and the second ground region 260.

The switch 276 may be electrically connected with the wireless communication circuit 121. The wireless communication circuit 121 may control an on/off operation of the switch 276. The wireless communication circuit 121 may control an on/off operation of the switch 276 based on a frequency band of a signal which the electronic device 100 intends to transmit/receive.

Figure 3A:
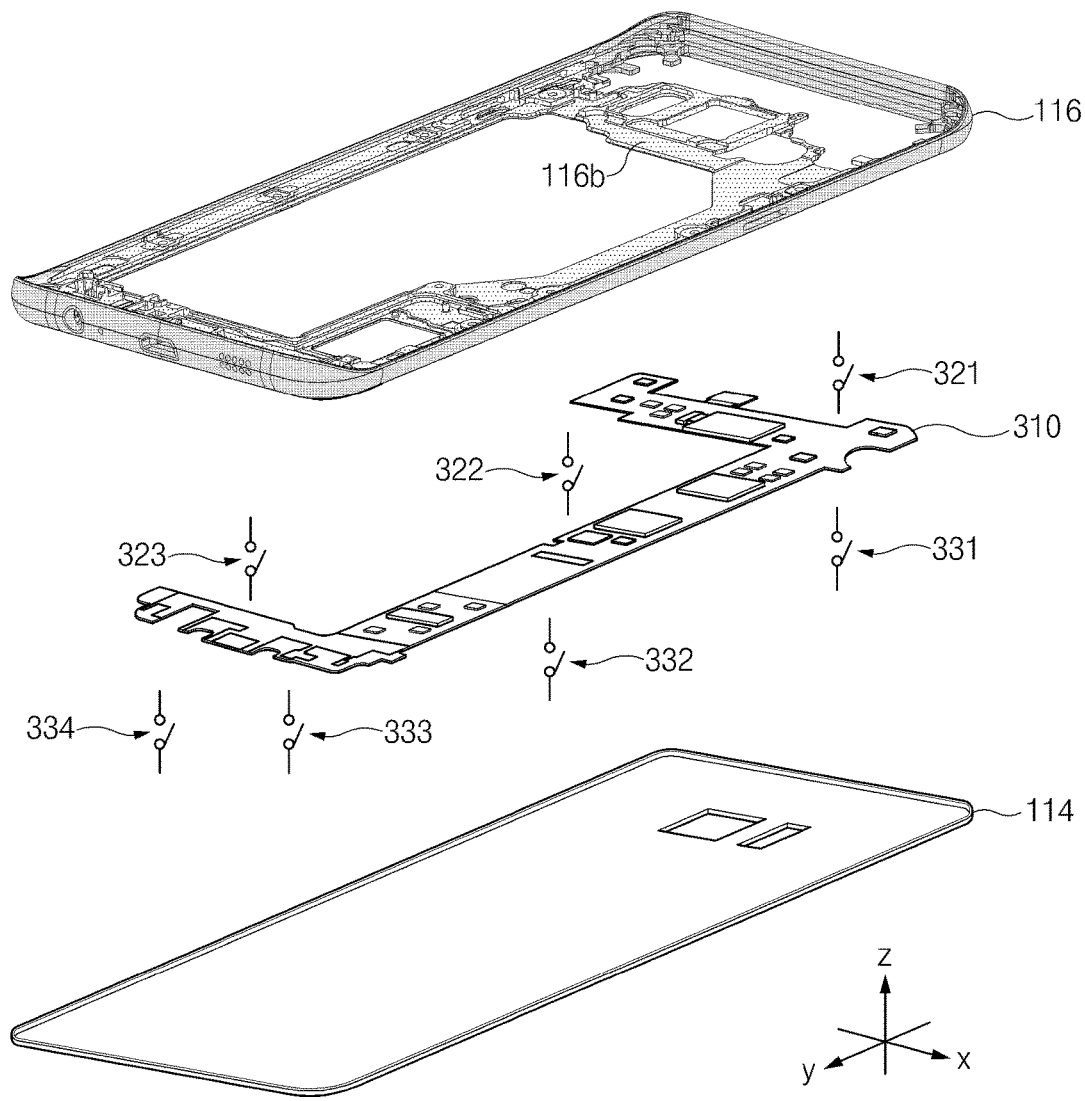
FIG. 3A is a diagram of a printed circuit board, according to an embodiment.
Figure 3B:
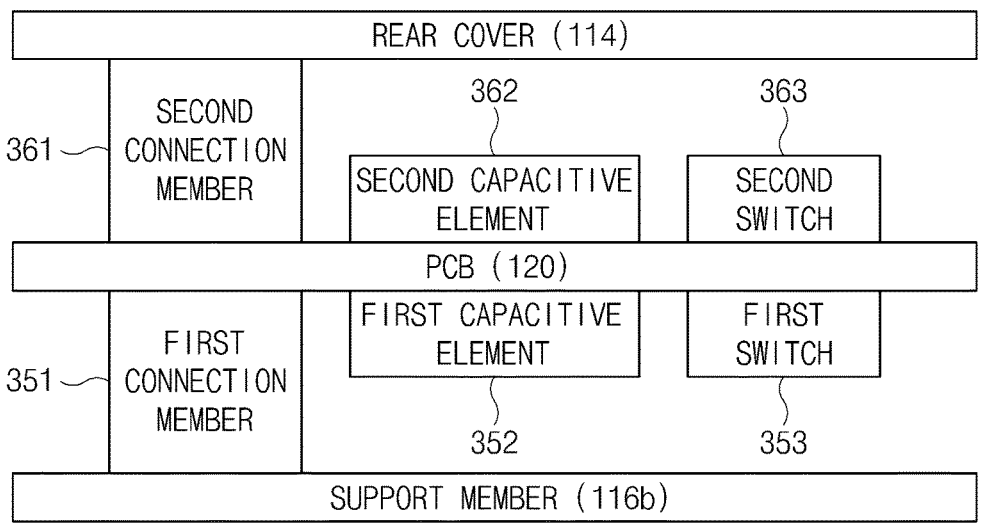
FIG. 3B is a diagram of a rear cover, a printed circuit board, and a support member, according to an embodiment.
Figure 3C:
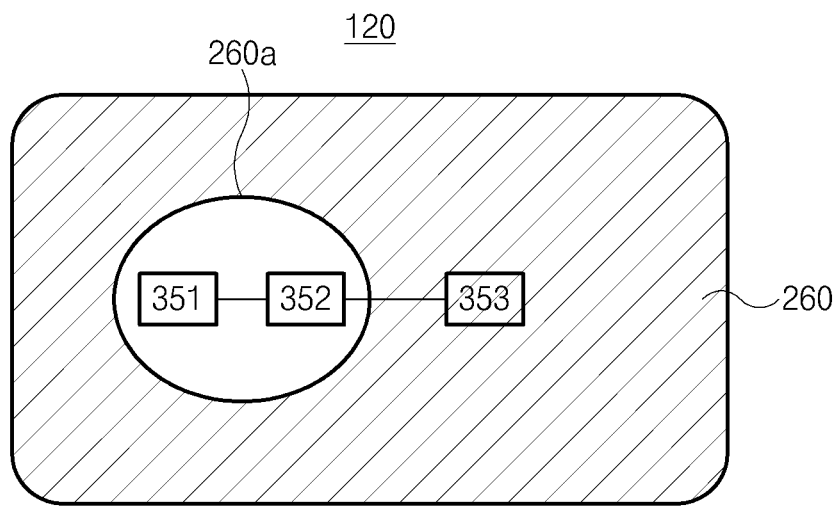
FIG. 3C is a diagram of a printed circuit board, according to an embodiment.

FIG. 3A is a diagram of a printed circuit board, according to an embodiment. FIG. 3B is a diagram of a rear cover, a printed circuit board, and a support member, according to an embodiment. FIG. 3C is a diagram of a printed circuit board, according to an embodiment. In the disclosure, a printed circuit board 310 illustrated in FIG. 3A may be similar to or the same as the printed circuit board 120 illustrated in FIGS. 1 and 2A.

Referring to FIG. 3A, first group switches 321, 322, and 323 may be arranged on one surface of the printed circuit board 310, and second group switches 331, 332, 333, and 334 may be arranged on an opposite surface of the printed circuit board 310. The first group switches 321, 322, and 323 and the second group switches 331, 332, 333, and 334 may be switches of the same kind. In FIG. 3A, the number of the first group switches 321, 322, and 323 is 3 and the number of the second group switches 331, 332, 333, and 334 is 4, but the number of the first group switches 321, 322, and 323 and the number of the second group switches 331, 332, 333, and 334 are not limited those amounts. For example, the number of first group switches may be 6, and the number of second group switches may be 13.

The support member 116b and the printed circuit board 310 may be electrically connected through the first group switches 321, 322, and 323. When at least one of the first group switches 321, 322, and 323 is on, the support member 116b and the printed circuit board 310 may be electrically connected. The printed circuit board 310 and the rear cover 114 may be electrically connected through the second group switches 331, 332, 333, and 334. When at least one of the second group switches 331, 332, 333, and 334 is on, the printed circuit board 310 and the rear cover 114 may be electrically connected through the at least one switch, which is on, from among the second group switches 331, 332, 333, and 334.

Referring to FIG. 3B, a first connection member 351 (e.g., C-clip), a first capacitive element 352 (e.g., a capacitor), and a first switch 353 (e.g., an SPDP switch or an SP4P switch) may be arranged on one surface of the printed circuit board 120. The first switch 353 may be any one of the first group switches 321, 322, and 323. The support member 116b and the printed circuit board 120 may be electrically connected through the first connection member 351, the first capacitive element 352, and the first switch 353. When the first switch 353 is on, the support member 116b may be electrically connected with the printed circuit board 120 through the first switch 353, the first capacitive element 352, and the first connection member 351.

A second connection member 361 (e.g., C-clip), a second capacitive element 362 (e.g., a capacitor), and a second switch 363 (e.g., an SPDT switch or an SP4P switch) may be arranged on an opposite surface of the printed circuit board 120. The second switch 363 may be any one of the second group switches 331, 332, 333, and 334. The rear cover 114 and the printed circuit board 120 may be electrically connected through the second connection member 361, the second capacitive element 362, and the second switch 363. When the second switch 363 is on, the printed circuit board 120 may be electrically connected with the rear cover 114 through the second switch 363, the second capacitive element 362, and the second connection member 361.

Referring to FIG. 3C, the first connection member 351 and the first capacitive element 352 may be arranged on a non-ground region 260a of the printed circuit board 120, and the first switch 353 may be positioned on the second ground region 260 of the printed circuit board 120. Unlike the second ground region 260, the non-ground region 260a may be formed of non-metal (e.g., plastic). The first connection member 351, the first capacitive element 352, and the first switch 353 may be connected by specified conductive lines.

Figure 4A:
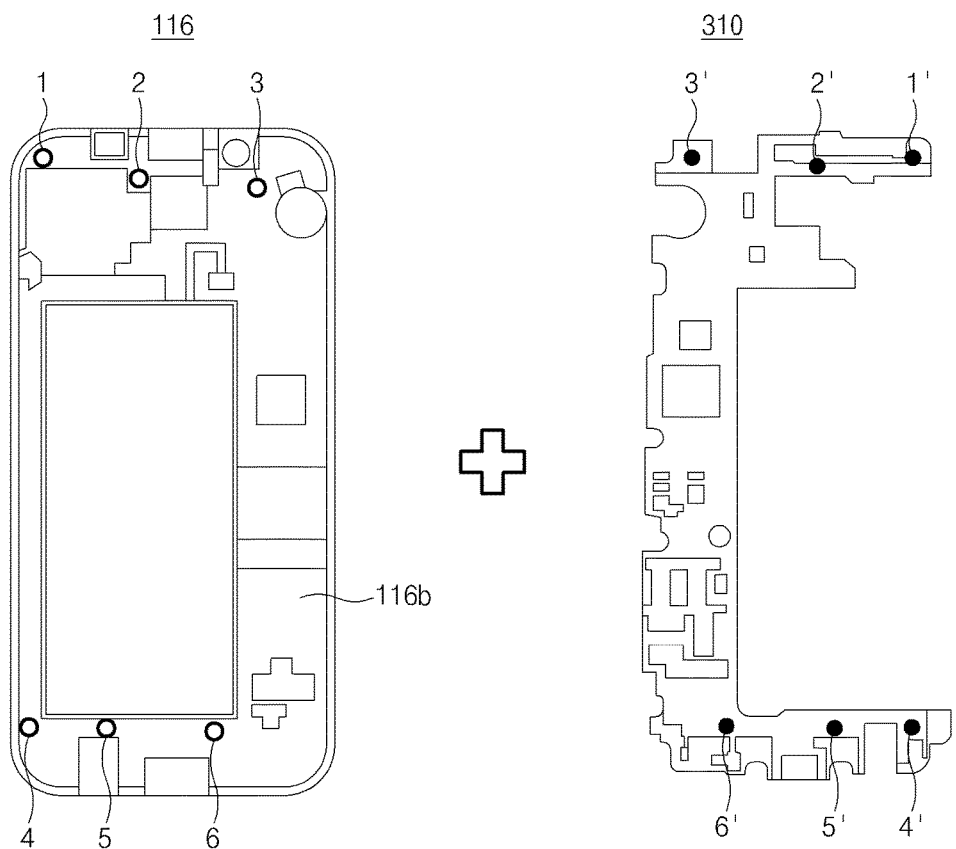
FIG. 4A is a diagram of a support member and a printed circuit board, which are coupled with each other, according to an embodiment.
Figure 4B:
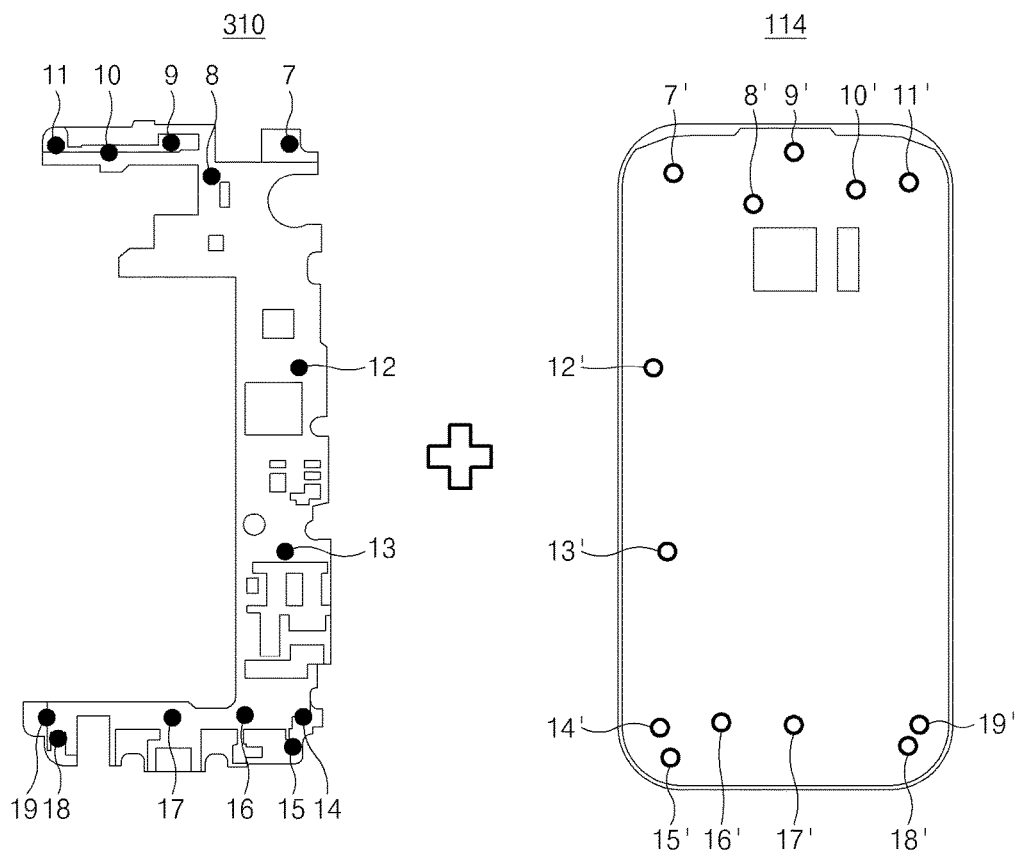
FIG. 4B is a diagram of a printed circuit board and a rear cover, which are coupled with each other, according to an embodiment.

FIG. 4A is a diagram of a support member and a printed circuit board, which are coupled with each other, according to an embodiment. FIG. 4B is a diagram of a printed circuit board and a rear cover, which are coupled with each other, according to an embodiment.

One surface of the support member 116b, which is coupled with the printed circuit board 310, and one surface of the printed circuit board 310, which is coupled with the support member 116b, are illustrated in FIG. 4A. One surface of the rear cover 114, which is coupled with the printed circuit board 310, and an opposite surface of the printed circuit board 310, which is coupled with the rear cover 114, are illustrated in FIG. 4B.

Referring to FIG. 4A, the support member 116b and the printed circuit board 310 may be electrically connected through a first switch to a sixth switch. A point 1 on the support member 116b and a point 1' on the printed circuit board 310 may be electrically connected through the first switch. A point 2 to a point 6 may be electrically connected with a point 2' to a point 6' through the second switch to the sixth switch, respectively.

Referring to FIG. 4B, the printed circuit board 310 and the rear cover 114 may be electrically connected through a seventh switch to a nineteenth switch. A point 7 on the printed circuit board 310 and a point 7' on the rear cover 114 may be electrically connected through the seventh switch. A point 8 to a point 19 may be electrically connected with a point 8' to a point 19' through the eighth switch to the nineteenth switch, respectively.

The wireless communication circuit 121 of FIG. 1 may control on/off operations of the first switch to the nineteenth switch. The wireless communication circuit 121 may control an on/off operation(s) of at least a part of the first switch to the nineteenth switch based on a frequency band of a signal which the electronic device 100 intends to transmit/receive. When receiving a signal through a bottom antenna in a high channel of the B20 band, the fourth switch may be off, and the remaining switches may be on. A matching table in which on/off states of switches are matched for each frequency band may be stored in a memory, and the wireless communication circuit 121 may control an on/off operation(s) of at least a part of the first switch to the nineteenth switch based on the matching tables below.

TABLE 1

| | Band B28 Channel | | |
|---|---|---|---|
| | Low channel | Mid channel | High channel |
| Total receive sensitivity of top/bottom antenna (dBm) | −90.1 | −90.5 | −88.5 |
| Total transmit power of top/bottom antenna (dBm) | 15.5 | 17.2 | 15.5 |

TABLE 2

| | Band B28 Channel | | |
|---|---|---|---|
| | Low channel | Mid Channel | High channel |
| Total receive sensitivity of top/bottom antenna (dBm) | −92.3 | −92.1 | −90.1 |
| Total transmit power of top/bottom antenna (dBm) | 15.5 | 17.2 | 17.7 |

Table 1 shows receive sensitivities and transmit powers of the top antenna and the bottom antenna when the first switch to the nineteenth switch are all in an on state. Likewise, Table 2 shows receive sensitivities and transmit powers of the top antenna and the bottom antenna when a specific switch (e.g., at least one of the first switch to the nineteenth switch) is in an off state. The receive sensitivity may be a minimum power of a signal which the top antenna and the bottom antenna may receive. The transmit power may be a maximum power of a signal which the top antenna and the bottom antenna may transmit. When the receive sensitivity of the top antenna and the bottom antenna is −90.0 dBm, the top antenna may receive a signal of −90.0 dBm or more. When the transmit power of the top antenna and the bottom antenna is 16.7 dBm, the bottom antenna may transmit a signal of 16.7 dBm or less.

Referring again to Table 1 and Table 2, When the electronic device 100 receives signals through the top antenna and the bottom antenna in a low channel of the B28 band, the sensitivity when the tenth switch is off may be better than the sensitivity when the tenth switch is on (e.g., 2.2 dBm increased). Accordingly, when the electronic device 100 intends to receive signals through the top antenna and the bottom antenna in the low channel of the B28 band, the wireless communication circuit 121 may make the tenth switch off.

When the electronic device 100 transmits signals through the top antenna and the bottom antenna in a high channel of the B28 band, the sensitivity when the seventeenth switch is off may be better than the sensitivity when the seventeenth switch is on (e.g., 2.2 dBm increased). Accordingly, when the electronic device 100 intends to transmit signals through the top antenna and the bottom antenna in the high channel of the B28 band, the wireless communication circuit 121 may make the seventeenth switch off.

Table 1 and Table 2 are examples of an embodiment, and the wireless communication circuit 121 may control on/off operations of the first switch to the seventeenth switch depending on a frequency band of a signal which the electronic device 100 intends to transmit/receive. In other words, depending on a frequency band of a signal which the electronic device 100 intends to transmit/receive, the wireless communication circuit 121 may make at least one of the first switch to the seventeenth switch off.

TABLE 3

| | | | Remarks (O: switch off) | | | | | | |
|---|---|---|---|---|---|---|---|---|---|
| | | | Tx | | | Rx | | | |
| Case | SW | Band | L | M | H | L | M | H | Code |
| 0 | 17$^{th}$ switch | B28 | o | o | | | | | 1111 |
| | | B20 | o | | | o | o | o | |
| | 12$^{th}$ switch | B5 | o | o | o | | | | |
| | | B8 | o | | | | | | |
| | 10$^{th}$ switch | B3 | o | | o | | | | |
| | | B1 | | | | | | | |
| | 11$^{th}$ switch | B7 | o | o | | o | o | o | |
| 1 | 17$^{th}$ switch | B28 | | | o | | | | 0111 |
| | | B20 | | o | o | | | | |
| | 12$^{th}$ switch | B5 | | o | | | | | |
| | | B8 | | o | o | | | | |
| | 10$^{th}$ switch | B3 | | o | | | | | |
| | | B1 | o | o | o | | | | |
| | 11$^{th}$ switch | B7 | o | | | | | | |
| 2 | 17$^{th}$ switch | B28 | | | | | | | 1011 |
| | | B20 | | o | | | | | |
| | 12$^{th}$ switch | B5 | | | | | | | |
| | | B8 | o | o | | | | | |
| | 10$^{th}$ switch | B3 | | | | | | | |
| | | B1 | | | | | | | |
| | 11$^{th}$ switch | B7 | | | | | | | |
| 3 | 17$^{th}$ switch | B28 | | | | o | o | o | 1101 |
| | | B20 | | | | | | | |
| | 12$^{th}$ switch | B5 | | | | o | o | o | |
| | | B8 | | | | o | o | o | |
| | 10$^{th}$ switch | B3 | | | | | | | |
| | | B1 | | | | | | | |
| | 11$^{th}$ switch | B7 | | | | | | | |
| 4 | 17$^{th}$ switch | B28 | | | | | | | 1110 |
| | | B20 | | | | | | | |
| | 12$^{th}$ switch | B5 | | | | | | | |
| | | B8 | | | | | | | |
| | 10$^{th}$ switch | B3 | | | | o | o | o | |
| | | B1 | | | | o | o | o | |
| | 11$^{th}$ switch | B7 | | | | | | | |

Table 3 above shows a matching table stored in a memory. The wireless communication circuit 121 may control on/off operations of the first switch to the nineteenth switch based on Table 3. In a code of "1111", when the electronic device 100 intends to transmit/receive a signal in a low channel of the B28 band, the wireless communication circuit 121 may make the seventeenth switch off. In a code of "0111", when the electronic device 100 intends to transmit/receive a signal in a mid-channel of the B5 band, the wireless communication circuit 121 may make the twelfth switch off.

The wireless communication circuit 121 may control an on/off operation(s) of at least a part of the first switch to the nineteenth switch depending on a grip/hold condition (e.g., a grip/hold location). When the user grips the electronic device 100, the wireless communication circuit 121 may make the eighteenth switch and the nineteenth switch off and may make the remaining switches on. When the user does not grip the electronic device 100, the wireless communication circuit 121 may make the third switch off and may make the remaining switches on. A matching table in which on/off states of switches are matched for each grip condition may be stored in a memory, and the wireless communication circuit 121 may control an on/off operation(s) of at least a part of the first switch to the nineteenth switch based on the matching table.

The wireless communication circuit 121 may control on/off operations of the first switch to the nineteenth switch depending on whether an external device is connected to the electronic device 100. When a USB connector or an earphone is connected to the electronic device 100, the wireless communication circuit 121 may make the fifth switch, the sixth switch, the sixteenth switch, and the seventeenth switch off and may make the remaining switches on. A matching table in which on/off states of switches according to whether an external device is connected to the electronic device 100 are matched may be stored in a memory, and the wireless communication circuit 121 may control on/off operations of the first switch to the nineteenth switch based on the matching table.

Figure 5:
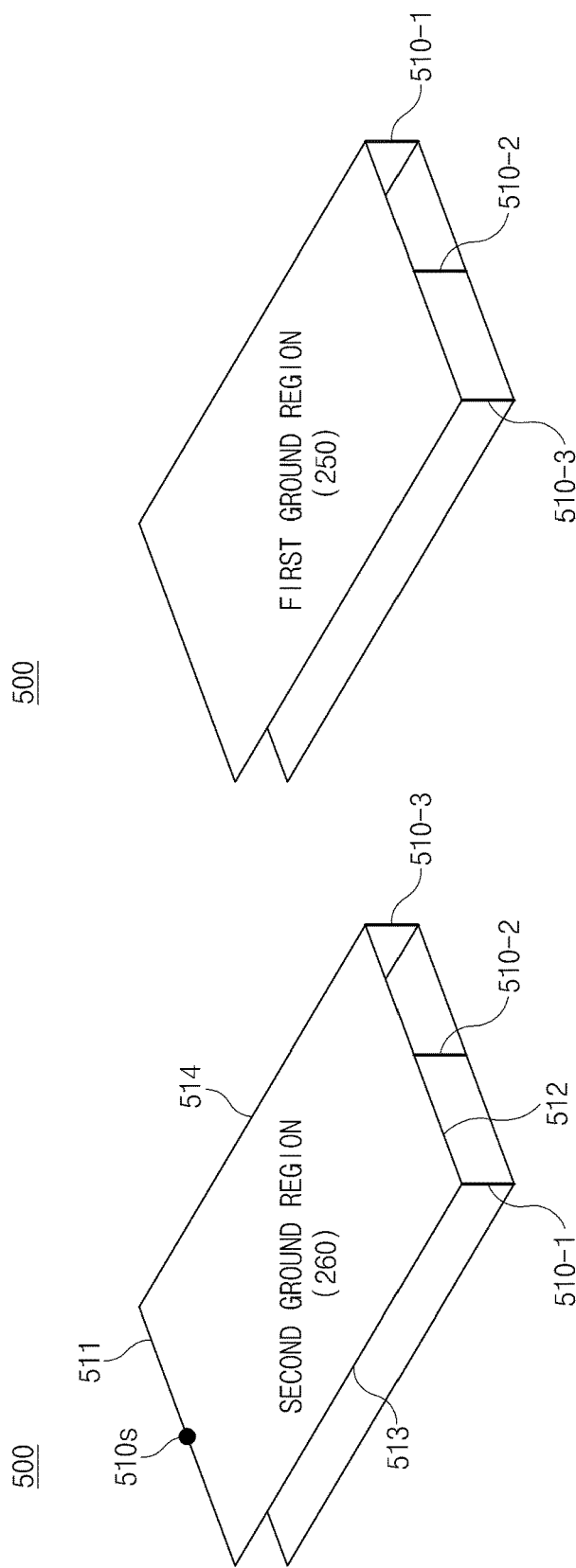
FIG. 5 is a diagram of a parallel plate waveguide, according to an embodiment.

FIG. 5 is a diagram of a parallel plate waveguide, according to an embodiment. A parallel plate waveguide 500 illustrated in FIG. 5 can be a configuration in which the first ground region 250 and the second ground region 260 illustrated in FIG. 2C are simplified. In other words, one surface of the parallel plate waveguide 500 may correspond to the second ground region 260, and another surface of the parallel plate waveguide 500 may correspond to the first ground region 250.

The parallel plate waveguide 500 includes the first ground region 250 and the second ground region 260. The first ground region 250 and the second ground region 260 may be connected through a plurality of points. For example, the first ground region 250 and the second ground region 260 may be connected through points 510-1, 510-2, and 510-3.

The parallel plate waveguide 500 may be fed through one point 510s (e.g., a feeding point). The feeding point 510s may be positioned at least one of sides 511, 512, 513, and 514 of the second ground region 260 (or the first ground region 250).

The points 510-1, 510-2, and 510-3 may operate as a ground point. A current supplied through the feeding point 510s may flow to the ground points 510-1, 510-2, and 510-3 through the parallel plate waveguide 500. As illustrated in FIG. 5, the ground points 510-1, 510-2, and 510-3 may be positioned at the side 512 facing away from the side 511 at which the feeding point 510s is positioned. The current may flow toward the second side 512 from the first side 511.

The number, locations, and shapes of the ground points 510-1, 510-2, and 510-3 may be different from those illustrated in FIG. 5. That is, the number, locations, and shapes of the ground points 510-1, 510-2, and 510-3 may be variously changed or modified depending on an electronic device to which the parallel plate waveguide 500 is applied. The ground points 510-1, 510-2, and 510-3 may be positioned at the third side 513 or the fourth side 514, and not at the second side 512. Also, the number of the ground points 510-1, 510-2, and 510-3 may be greater than, equal to, or less than 3.

Figure 6A:
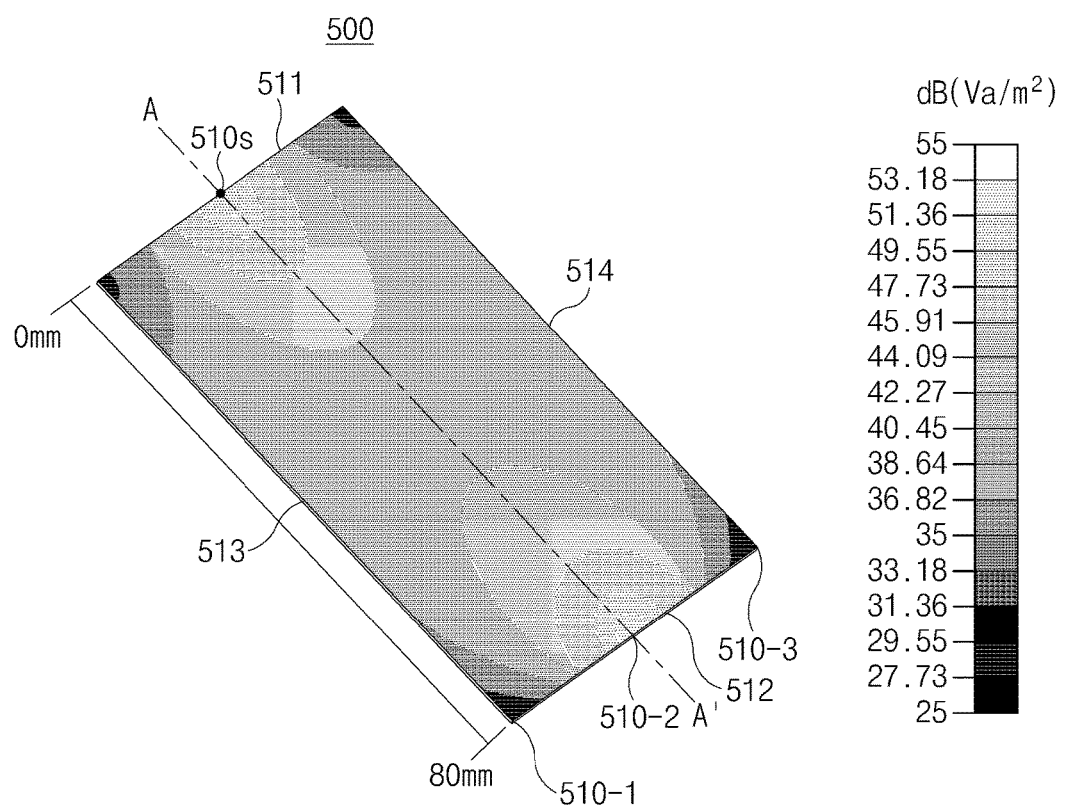
FIG. 6A is a diagram of a parallel plate waveguide on which the strength of a magnetic field is indicated, according to an embodiment.
Figure 6B:
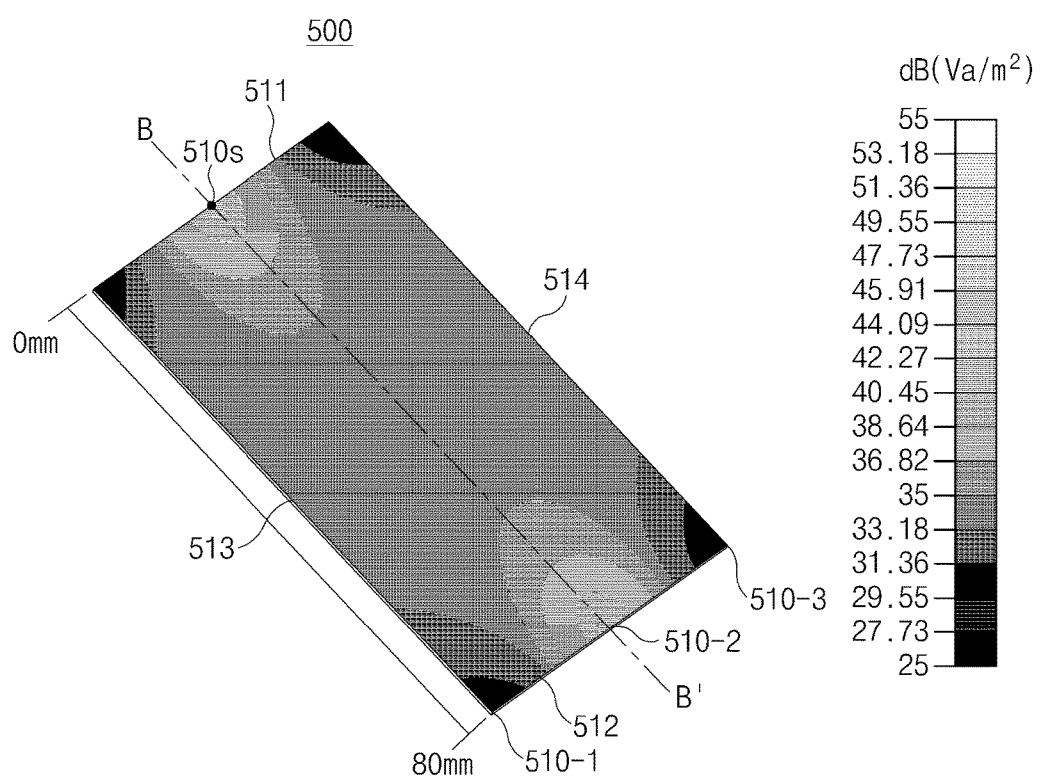
FIG. 6B is a diagram of a parallel plate waveguide on which the strength of a magnetic field is indicated, according to an embodiment.

FIG. 6A is a diagram of a parallel plate waveguide on which the strength of a magnetic field is indicated, according to an embodiment. FIG. 6B is a diagram of a parallel plate waveguide on which the strength of a magnetic field is indicated, according to an embodiment.

FIG. 6A shows the parallel plate waveguide 500 on which the strength of the magnetic field is indicated when the ground points 510-1, 510-2, and 510-3 are connected to each other through switching. FIG. 6B shows the parallel plate waveguide 500 on which the strength of the magnetic field is indicated when the ground points 510-1, 510-2, and 510-3 are disconnected from each other through switching.

Since the ground points 510-1, 510-2, and 510-3 are connected to each other, a current fed to the feeding point 510s may flow to the ground points 510-1, 510-2, and 510-3. As such, the current can go from the first side 511 toward the second side 512, the strength of the magnetic field may become weaker and may again become stronger. Also, the strength of the magnetic field around the first side 511 may be almost similar to the strength of the magnetic field around the second side 512. The strength of the magnetic field around the first side 511 and the strength of the magnetic field around the second side 512 may be around 51 dB.

Since the ground points 510-1, 510-2, and 510-3 are disconnected from each other, the amount of a current flowing the ground points 510-1, 510-2, and 510-3 may be relatively small compared to FIG. 6A. As such, the strength of the magnetic field applied to the parallel plate waveguide 500 may be relatively weak compared to FIG. 6A. Even around the first side 511 or the second side 512, the strength of the magnetic field may be weak compared to FIG. 6A (approximately 45 dB).

FIGS. 6A and 6B indicate the strength of the magnetic field when the wireless communication circuit 121 applies a signal having a resonant frequency of approximately 872 MHz to the parallel plate waveguide 500. The strength of the magnetic field may vary with a frequency of a signal which the wireless communication circuit 121 applies to the parallel plate waveguide 500. When the wireless communication circuit 121 applies a signal having a resonant frequency of not 872 MHz but approximately 500 MHz to the parallel plate waveguide 500, the strength of the magnetic field may be different from that illustrated in FIGS. 6A and 6B.

Figure 7:
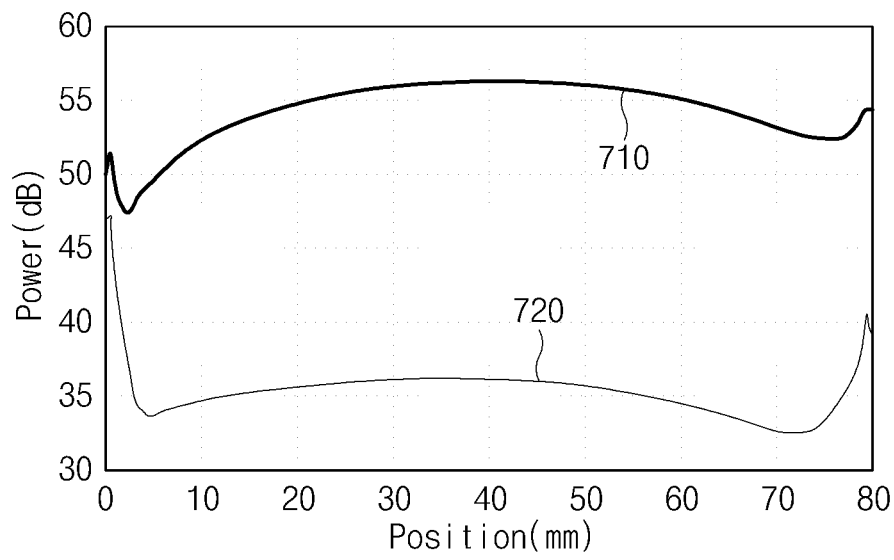
FIG. 7 is a graph, according to an embodiment.

FIG. 7 is a graph, according to an embodiment. Graphs 710 and 720 are displayed in FIG. 7 and respectively indicate the strengths of the magnetic field illustrated in FIGS. 6A and 6B. The graphs 710 and 720 show the strengths of the magnetic field respectively corresponding to cross sections taken along a line A-A' and a line B-B' of FIGS. 6A and 6B.

In graph 710 the strength of the magnetic field decreases around the first side 511 and gradually increases as a distance from the center of the parallel plate waveguide 500 decreases. Also, in graph 710 the strength of the magnetic field gradually decreases as it goes toward the second side 512 from the center of the parallel plate waveguide 500 and again increases around the second side 512.

Referring to the graph 720, even when the ground points 510-1, 510-2, and 510-3 are disconnected from each other, a variation in the strength of the magnetic field may be similar in shape to the variation in the strength of the magnetic field when the ground points 510-1, 510-2, and 510-3 are connected to each other. The strength of the magnetic field may decrease around the first side 511 and may gradually increase as a distance from the center of the parallel plate waveguide 500 decreases. Also, the strength of the magnetic field may gradually decrease as it goes toward the second side 512 from the center of the parallel plate waveguide 500 and may again increase around the second side 512. However, it will be appreciated that the strength of the magnetic field when the ground points 510-1, 510-2, and 510-3 are connected to each other is weak overall compared to the case where the ground points 510-1, 510-2, and 510-3 are disconnected from each other.

It will also be appreciated that the magnitude of energy transmitted from the first side 511 to the second side 512 varies as the ground points 510-1, 510-2, and 510-3 are disconnected from each other or are connected to each other. That is, the amount of a parasitic current flowing into the parallel plate waveguide 500 may vary as the ground points 510-1, 510-2, and 510-3 are disconnected from each other or are connected to each other. Also, a magnetic field distribution (or an electromagnetic field distribution) of the parallel plate waveguide 500 may vary as the ground points 510-1, 510-2, and 510-3 are disconnected from each other or are connected to each other. The principle may also be applied to the top antenna 220 and the bottom antenna 210 described with reference to FIG. 2B. The electronic device 100 may reduce the amount of parasitic current by closing or opening the switches 131, 132, and 133. Also, the electronic device 100 may increase the isolation between the top antenna 220 and the bottom antenna 210 by closing or opening the switches 131, 132, and 133.

Figure 8A:
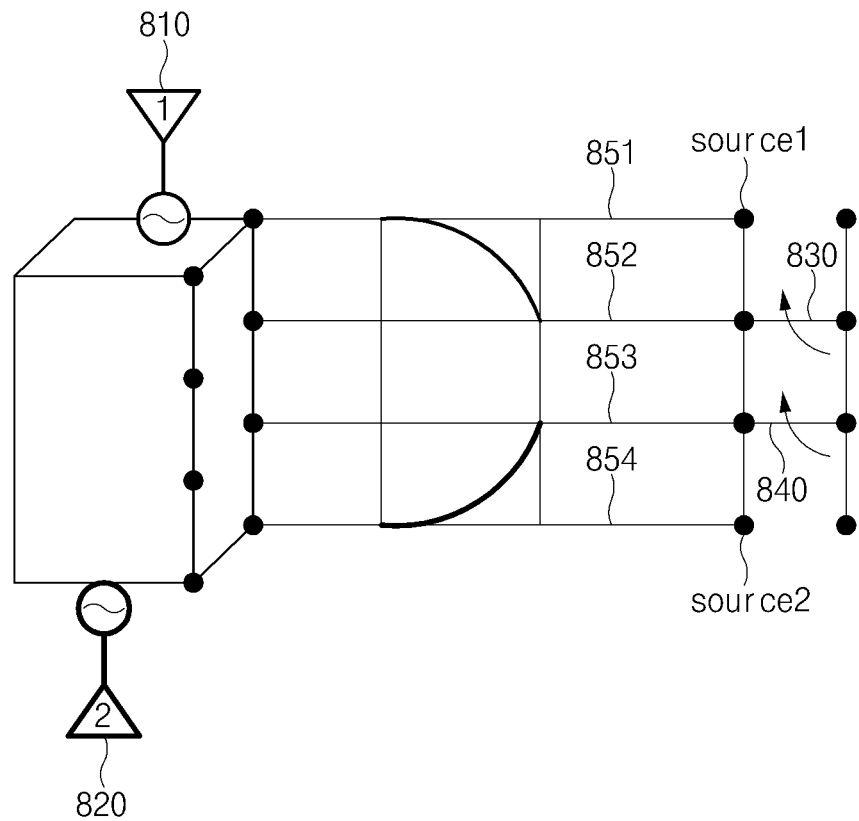
FIG. 8A is a diagram of an electronic device, according to an embodiment.
Figure 8B:
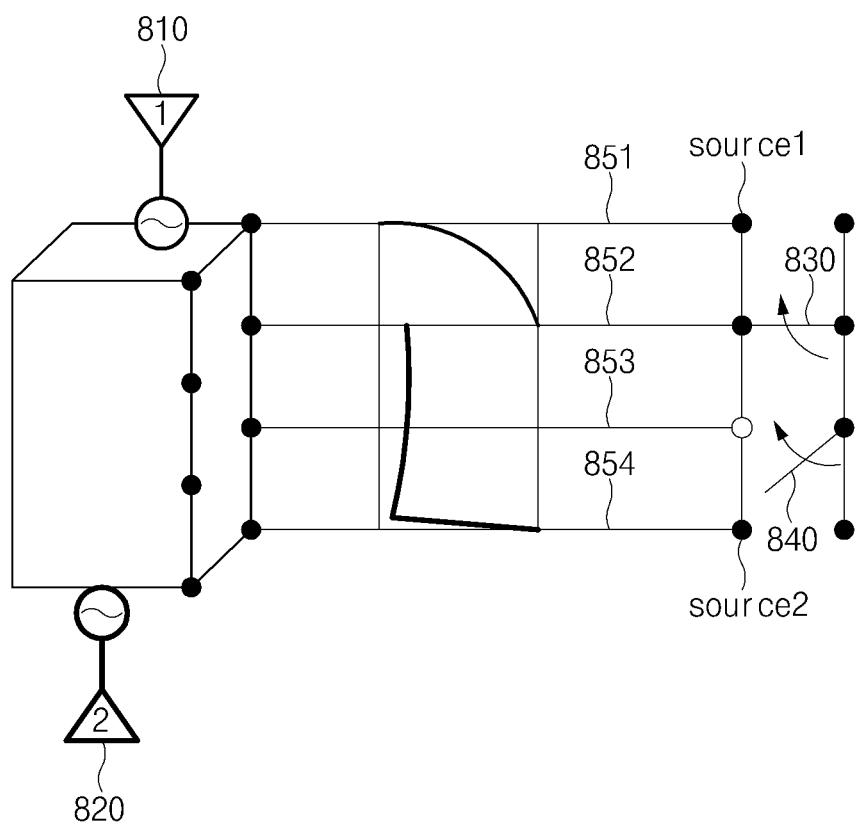
FIG. 8B is a diagram of an electronic device, according to an embodiment.
Figure 8C:
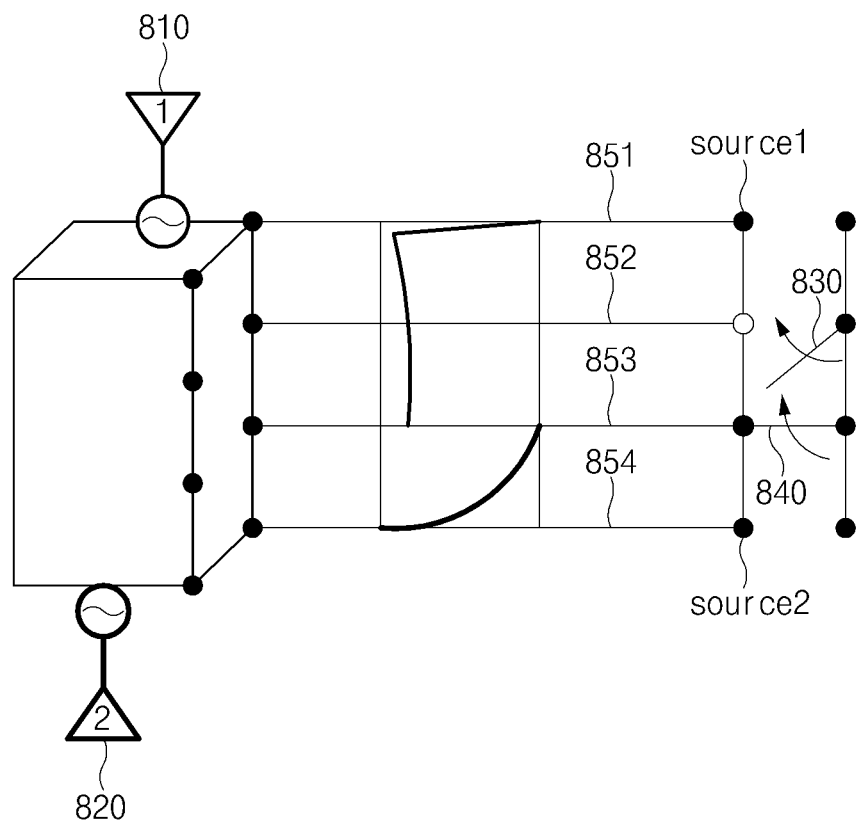
FIG. 8C is a diagram of an electronic device, according to an embodiment.

FIG. 8A is a diagram of an electronic device, according to an embodiment. FIG. 8B is diagram of an electronic device, according to an embodiment. FIG. 8C is a diagram of an electronic device, according to an embodiment.

In FIGS. 8A to 8C, a first antenna 810 may correspond to the top antenna 220 described with reference to FIG. 2B, and a second antenna 820 may correspond to the bottom antenna 210 described with reference to FIG. 2B. Each of a first switch 830 and a second switch 840 may correspond to any one of the switches 131, 132, and 133 illustrated in FIG. 1.

Referring to FIG. 8A, both the first switch 830 and the second switch 840 may be closed. Since both the first switch 830 and the second switch 840 are closed, the strength of a magnetic field may gradually increase as it goes from a first line 851 toward a second line 852. The strength of the magnetic field may gradually increase as it goes from a fourth line 854 toward a third line 853. The first line 851 which is a line for indicating a position of the first antenna 810 may be positioned on substantially the same plane as the first antenna 810. The second line 852 which is a line for indicating a position of the support member 116b may be positioned on substantially the same plane as the support member 116b. The third line 853 which is a line for indicating a position of the printed circuit board 120 may be positioned on substantially the same plane as the printed circuit board 120. The fourth line 854 which is a line for indicating a position of the second antenna 820 may be positioned on substantially the same plane as the second antenna 820.

Referring to FIG. 8B, the first switch 830 may be closed, and the second switch 840 may be opened. Since the first switch 830 is closed, the strength of the magnetic field may gradually increase as it goes from the first line 851 toward the second line 852. However, since the second switch 840 is opened, the strength of the magnetic field may sharply decrease as it goes from the fourth line 854 toward the third line 853. That is, the isolation between the first antenna 810 and the second antenna 820 corresponding to the case of FIG. 8B may increase compared with the case of FIG. 8A, and thus, an optimum radiation condition of the second antenna 820 may be formed (or satisfied).

Referring to FIG. 8C, the first switch 830 may be opened, and the second switch 840 may be closed. Since the first switch 830 is opened, the strength of the magnetic field may sharply decrease as it goes from the first line 851 toward the second line 852. However, since the second switch 840 is closed, the strength of the magnetic field may gradually increase as it goes from the fourth line 854 toward the third line 853. That is, the isolation between the first antenna 810 and the second antenna 820 corresponding to the case of FIG. 8C may increase compared with the case of FIG. 8A, and thus, an optimum radiation condition of the first antenna 810 may be formed (or satisfied).

Figure 9A:
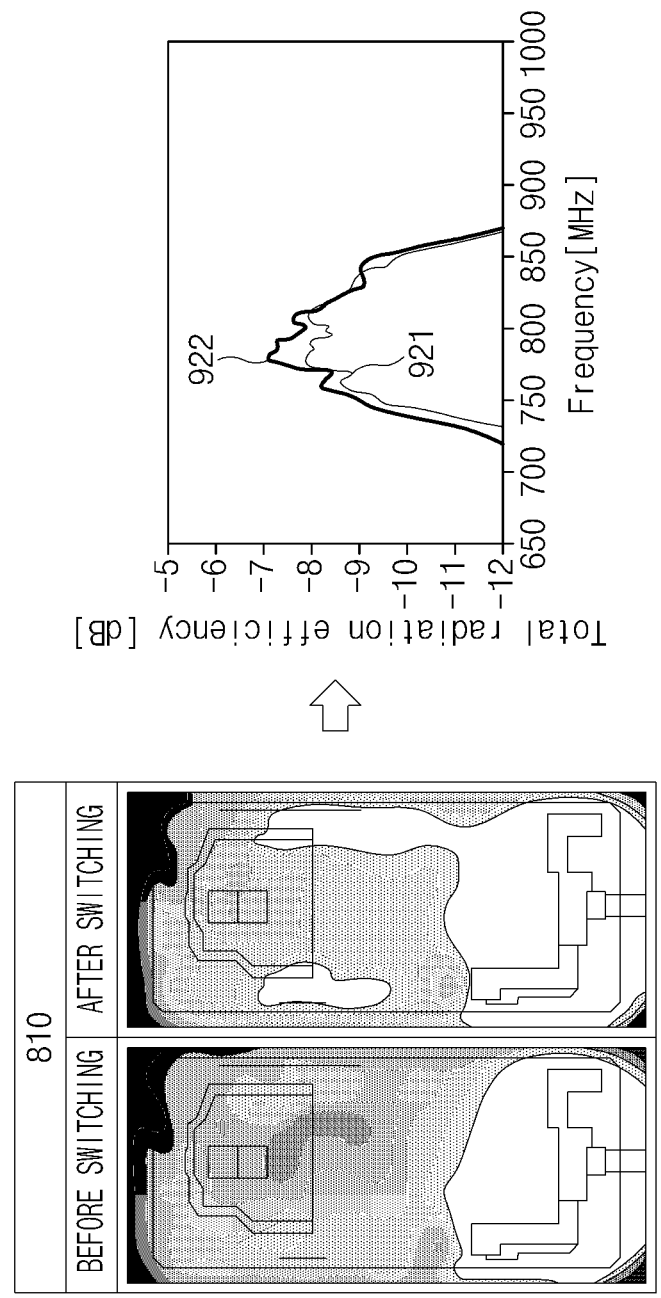
FIG. 9A a diagram of a parasitic current and a radiation efficiency around a top antenna, according to an embodiment.
Figure 9B:
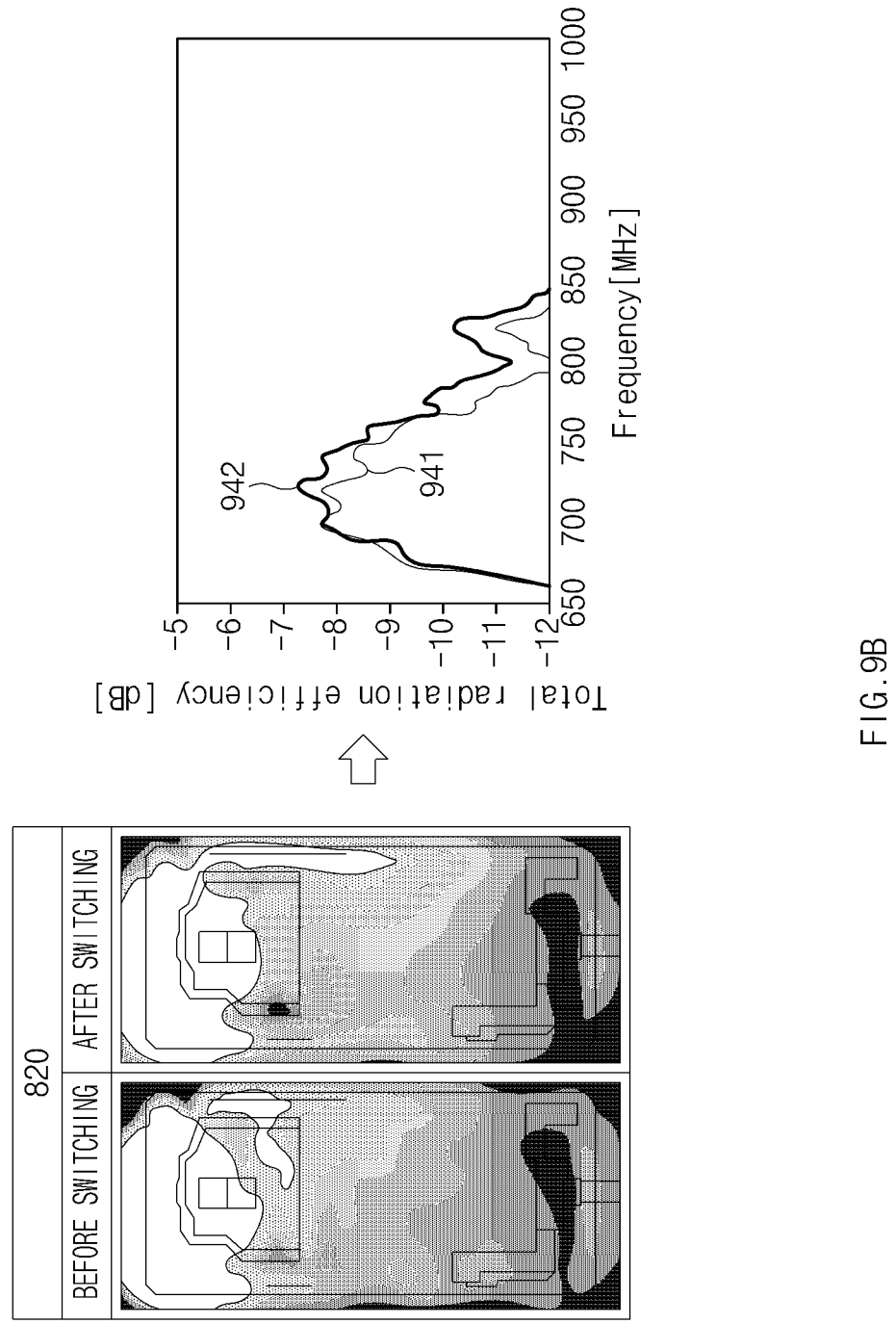
FIG. 9B a diagram of a parasitic current and a radiation efficiency around a bottom antenna, according to an embodiment.

FIG. 9A a diagram of a parasitic current and a radiation efficiency around a top antenna, according to an embodiment. FIG. 9B a diagram of a parasitic current and a radiation efficiency around a bottom antenna, according to an embodiment.

Referring to FIG. 9A, a parasitic current around the first antenna 810 (or the top antenna 220) varies with on/off states of the first switch 830 and the second switch 840. For example, when the first switch 830 is off, the parasitic current around the first antenna 810 may decrease.

A graph 921 represents a radiation efficiency of the first antenna 810 before switching, a graph 922 represents a radiation efficiency of the first antenna 810 after switching. The expression "before switching" may be defined as both the first switch 830 and the second switch 840 being in an on state. The expression "after switching" may be defined as the first switch 830 or the second switch 840 being in an off state. It may be understood from the graph 921 and the graph 922 that the radiation efficiency of the first antenna 810 varies with on/off states of the first switch 830 and the second switch 840. When the first switch 830 is off, the transmit efficiency of the first antenna 810 in a band ranging from approximately 708 MHz to 743 MHz, and the receive efficiency of the first antenna 810 in a band ranging from approximately 763 MHz to 798 MHz may increase.

Referring to FIG. 9B, a parasitic current around the second antenna 820 (or the bottom antenna 210) varies with on/off states of the first switch 830 and the second switch 840. For example, when the second switch 840 is off, the parasitic current around the second antenna 820 may decrease.

A graph 941 represents a radiation efficiency of the second antenna 820 before switching, a graph 942 represents a radiation efficiency of the second antenna 820 after switching. It may be understood from the graph 941 and the graph 942 that the radiation efficiency of the second antenna 820 varies with on/off states of the first switch 830 and the second switch 840. When the second switch 840 is off, the transmit efficiency of the second antenna 820 in a band ranging from approximately 708 MHz to 743 MHz, and the receive efficiency of the second antenna 820 in a band ranging from approximately 763 MHz to 798 MHz may increase.

The electronic device 100 may include a housing that includes a first surface, a second surface facing away from the first surface, and a side surface surrounding a space between the first surface and the second surface, the side surface including a first edge facing a first direction and having a first length, a second edge being parallel to the first edge and having the first length, a third edge connecting one end of the first edge and one end of the second edge, and a fourth edge connecting an opposite end of the first edge and an opposite end of the second edge and being parallel to the third edge, a support member that is positioned within the housing and includes a first ground region, a printed circuit board that is positioned inside the housing 110 and includes a second ground region, a plurality of switches that electrically connect the first ground region and the second ground region at a plurality of points, a first antenna element that includes at least a portion of the first edge and is electrically connected with the first ground region of the support member, a second antenna element that includes at least a portion of the second edge and is electrically connected with the second ground region of the printed circuit board, and a wireless communication circuit that is positioned within the housing. The wireless communication circuit may transmit/receive a signal in a first frequency band based on a first electrical path formed through the first antenna element, may transmit/receive a signal in a second frequency band based on a second electrical path formed through the second antenna element, may set ON/OF states of the plurality of switches to a first arrangement while the signal in the first frequency band is transmitted/received, and may set the ON/OF states of the plurality of switches to a second arrangement while the signal in the second frequency band is transmitted/received. At least one switch of the plurality of switches may be set to an ON state in each of the first arrangement and the second arrangement.

The support member 116*b* may form at least a portion of the side surface 116 or may be connected with the side surface 116.

The wireless communication circuit 121 may set the ON/OFF states of the plurality of switches 131, 132, and 133 to a third arrangement based on whether a user input is received.

The wireless communication circuit 121 may set the ON/OFF states of the plurality of switches 131, 132, and 133 to a third arrangement based on whether an external device is connected to the electronic device 100.

The wireless communication circuit 121 may make the plurality of switches 131, 132, and 133 on while the signal of the first frequency band and the signal of the second band are not transmitted/received.

The printed circuit board 120 may include a plurality of layers, and the second ground region 260 may correspond to any one of the plurality of layers.

The plurality of switches 131, 132, and 133 may correspond to first group switches, and the electronic device 100 may further include second group switches 331, 332, 333, and 334 electrically connecting the second ground region 260 of the printed circuit board 120 and the second surface 114 at a plurality of points.

The wireless communication circuit 121 may set ON/OF states of the second group switches 331, 332, 333, and 334 to a third arrangement while the signal in the first frequency band is transmitted/received, and may set the ON/OF states of the second group switches 331, 332, 333, and 334 to a fourth arrangement while the signal in the second frequency band is transmitted/received.

At least one switch of the second group switches may be set to an ON state in each of the third arrangement and the fourth arrangement according to an embodiment of the present disclosure.

The second surface may include a conductive material, and the second group switches are connected to the conductive material.

The electronic device may include a housing that includes a first surface, a second surface facing away from the first surface, and a side surface surrounding a space between the first surface and the second surface, the side surface including a first edge facing a first direction and having a first length, a second edge being parallel to the first edge and having the first length, a third edge connecting one end of the first edge and one end of the second edge, and a fourth edge connecting an opposite end of the first edge and an opposite end of the second edge and being parallel to the third edge, a support member that is positioned within the housing and includes a first ground region, a printed circuit board that is positioned inside the housing and includes a second ground region, a plurality of switches that electrically connect the first ground region and the second ground region at a plurality of points, a first antenna element that includes at least a portion of the first edge and is electrically connected with the first ground region of the support member, a second antenna element that includes at least a portion of the second edge and is electrically connected with the second ground region of the printed circuit board, and a wireless communication circuit that is positioned within the housing. The wireless communication circuit may transmit/receive a signal in a first frequency band based on at least one of a first electrical path formed through the first antenna element and a second electrical path formed through the second antenna element, may set ON/OF states of the plurality of switches to a first arrangement while the signal in the first frequency band is transmitted/received, may set the ON/OFF states of the plurality of switches to a second arrangement for the purpose of transmitting/receiving the signal in the second frequency band, and may transmit/receive the signal in the second frequency band based on at least one of the first electrical path and the second electrical path, when the ON/OFF states of the plurality of switches are set to the second arrangement. At least one switch of the plurality of switches may be set to an ON state in each of the first arrangement and the second arrangement.

The wireless communication circuit 121 may transmit/receive the signal of the first frequency band based on the first electrical path, and may transmit/receive the signal of the second frequency band based on the second electrical path.

The electronic device 100 may further include a cover glass 112 that is positioned on the first surface, and a rear cover 114 that is positioned on the second surface.

The electronic device 100 may further include additional switches 331, 332, 333, and 334 that electrically connect the second ground region 260 and the rear cover 114.

The wireless communication circuit 121 may set ON/OF states of the additional switches 331, 332, 333, and 334 to a third arrangement while the signal in the first frequency band is transmitted/received.

The wireless communication circuit 121 may set the ON/OF states of the additional switches 331, 332, 333, and 334 to a fourth arrangement for the purpose of transmitting/receiving the signal in the second frequency band.

The rear cover 114 may be formed of a metal or may include a conductive material at a position corresponding to the additional switches 331, 332, 333, and 334.

The electronic device may include a housing that includes a cover glass, a rear cover facing away from the cover glass, a support member interposed between the cover glass and the rear cover, and a side member surrounding the support member, a printed circuit board (PCB) that is interposed between the support member and the rear cover, a plurality of switches that connect the support member 116b and the printed circuit board 120, a first antenna element that includes a first region of the side member and is electrically connected with the printed circuit board, a second antenna element that includes a second region of the side member and is electrically connected with the support member, and a memory that is positioned on the printed circuit board and stores data in which an on/off operation of each of the switches is mapped onto a specified condition, and a wireless communication circuit that is positioned on the printed circuit board. The wireless communication circuit may control the on/off operation of each of the switches based on the data when the specified condition is satisfied, may feed the first antenna element, may transmit/receive the signal in the first frequency band based on a first electrical path formed through the first antenna element, may feed the second antenna element, and may transmit/receive the signal in the second frequency band based on a second electrical path formed through the second antenna element.

The wireless communication circuit 121 may control the on/off operation of each of the switches 131, 132, and 133 based on the data, when a user input made by gripping the electronic device 100 is received.

The wireless communication circuit 121 may control the on/off operation of each of the switches 131, 132, and 133 based on the data, when an external device is connected to the electronic device 100.

The electronic device may include a housing that includes a first surface, a second surface facing away from the first surface, and a side member surrounding a space between the first surface and the second surface, a display that is exposed through the first surface and is positioned within the space, a first ground plane that is parallel to the first surface and is positioned within the space, a second ground plane that is parallel to the first surface, is positioned within the space, and is at least partially overlapped with the first ground plane when viewed from above the first surface, a first antenna element that is electrically connected with the first ground plane and includes a portion of the side member, a second antenna element that is electrically connected with the second ground plane and includes another portion of the side member, at least one wireless communication circuit that is electrically connected with the first antenna element and the second antenna element, and at least one switching element that electrically connects the first ground plane and the second ground plane.

The electronic device 100 may further include a printed circuit board 120 that is positioned within the space, and the first ground plane 260 may correspond to a portion of the printed circuit board 120.

The at least one switching element 131, 132, or 133 may be positioned within the printed circuit board 120 or one the printed circuit board 120.

The electronic device 100 may further include a conductive plate 116b that is positioned within a space between the printed circuit board 120 and the second surface 114, and the second ground plane 250 may include at least a portion of the conductive plate 116b.

The side member 116 may include a first portion 116-2 that has a first length and extends in a first direction, a second portion 116-3 that has a second length longer than the first length and extends in a second direction perpendicular to the first direction, a third portion 116-1 that has the first length and extends parallel to the first portion, and a fourth portion 116-4 that has the second length and extends parallel to the second portion. The first antenna element may include at least a portion of the first portion 116-2, and the second antenna element may include at least a portion of the third portion 116-1.

Figure 10:
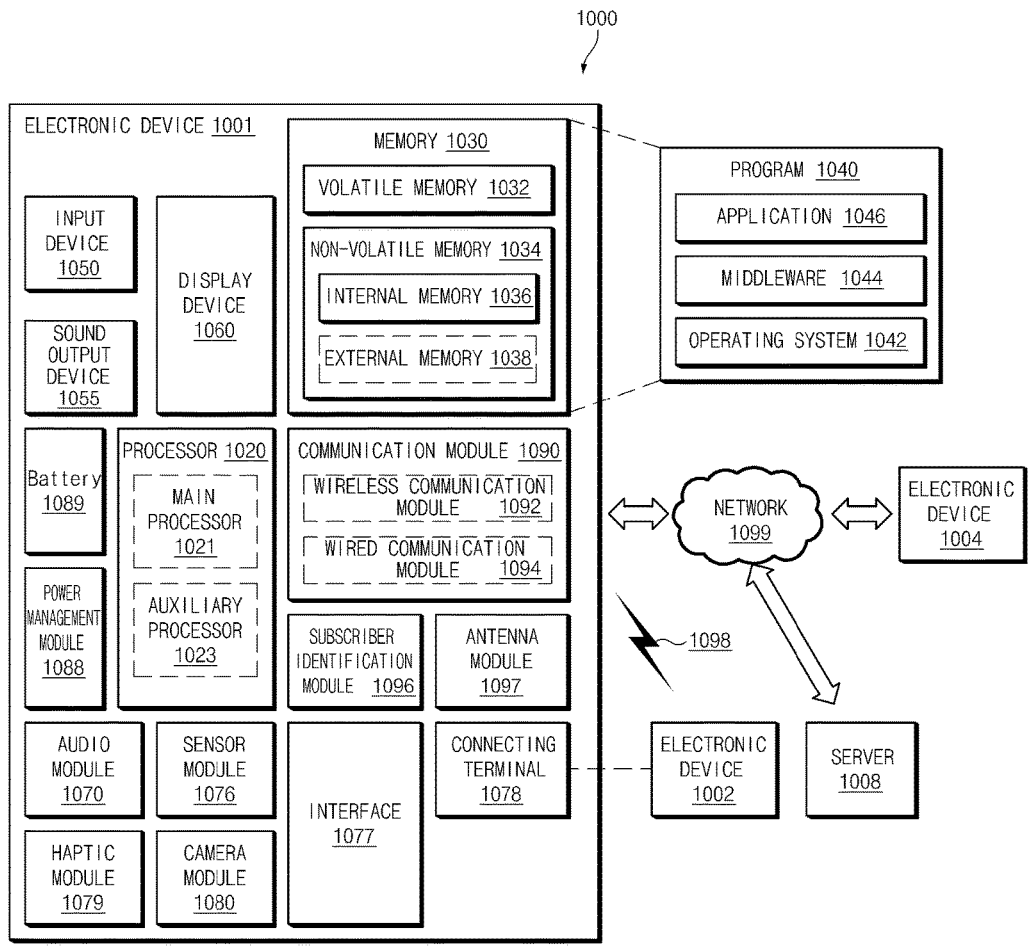
FIG. 10 is a diagram of an electronic device in a network environment, according to an embodiment.

FIG. 10 is a diagram of an electronic device in a network environment, according to an embodiment.

Referring to FIG. 10, an electronic device 1001 may communicate with an electronic device 1002 through a first network 1098 (e.g., a short-range wireless communication) or may communicate with an electronic device 1004 or a server 1008 through a second network 1099 (e.g., a long-distance wireless communication) in a network environment 1000. The electronic device 1001 may communicate with the electronic device 1004 through the server 1008. The electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, and an antenna module 1097. At least one (e.g., the display device 1060 or the camera module 1080) among components of the electronic device 1001 may be omitted or other components may be added to the electronic device 1001. Some components may be integrated and implemented as in the case of the sensor module 1076 (e.g., a fingerprint sensor, an iris sensor, or an illuminance sensor) embedded in the display device 1060 (e.g., a display).

The processor 1020 may operate software (e.g., a program 1040) to control at least one of other components (e.g., a hardware or software component) of the electronic device 1001 connected to the processor 1020 and may process and compute a variety of data. The processor 1020 may load a command set or data, which is received from other components (e.g., the sensor module 1076 or the communication module 1090), into a volatile memory 1032, may process the loaded command or data, and may store result data into a nonvolatile memory 1034. The processor 1020 may include a main processor 1021 (e.g., a central processing unit or an application processor) and an coprocessor 1023 (e.g., a graphic processing device, an image signal processor, a sensor hub processor, or a communication processor), which operates independently from the main processor 1021, additionally or alternatively uses less power than the main processor 1021, or is specified to a designated function. The coprocessor 1023 may operate separately from the main processor 1021 or may be embedded therein.

The coprocessor 1023 may control at least some of functions or states associated with at least one component (e.g., the display device 1060, the sensor module 1076, or the communication module 1090) among the components of the electronic device 1001 instead of the main processor 1021 while the main processor 1021 is in an inactive (e.g., sleep) state or together with the main processor 1021 while the main processor 1021 is in an active (e.g., an application execution) state. The coprocessor 1023 (e.g., the image signal processor or the communication processor) may be implemented as a part of another component (e.g., the camera module 1080 or the communication module 1090) that is functionally related to the coprocessor 1023. The memory 1030 may store a variety of data used by at least one component (e.g., the processor 1020 or the sensor module 1076) of the electronic device 1001, e.g., software (e.g., the program 1040) and input data or output data with respect to commands associated with the software. The memory 1030 may include the volatile memory 1032 or the nonvolatile memory 1034.

The program 1040 may be stored in the memory 1030 as software and may include an operating system 1042, a middleware 1044, or an application 1046.

The input device 1050 may be a device for receiving a command or data, which is used for a component (e.g., the processor 1020) of the electronic device 1001, from an outside (e.g., a user) of the electronic device 1001 and may include a microphone, a mouse, or a keyboard.

The sound output device 1055 may be a device for outputting a sound signal to the outside of the electronic device 1001 and may include a speaker used for general purposes, such as multimedia play or recordings play, and a receiver used only for receiving calls. The receiver and the speaker may be either integrally or separately implemented.

The display device 1060 may be a device for visually presenting information to the user and may include a display, a hologram device, or a projector and a control circuit for controlling a corresponding device. The display device 1060 may include a touch circuitry or a pressure sensor for measuring an intensity of pressure on the touch.

The audio module 1070 may convert a sound and an electrical signal in dual directions. The audio module 1070 may obtain the sound through the input device 1050 or may output the sound through the electronic device 1002 (e.g., a speaker or a headphone) wired or wirelessly connected to the sound output device 1055 or the electronic device 1001.

The sensor module 1076 may generate an electrical signal or a data value corresponding to an operating state (e.g., power or temperature) inside or an environmental state outside the electronic device 1001. The sensor module 1076 may include a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1077 may support a designated protocol wired or wirelessly connected to the electronic device 1002. The interface 1077 may include an HDMI (high-definition multimedia interface), a USB (universal serial bus) interface, an SD (secure digital) card interface, or an audio interface.

A connection terminal 1078 may include a connector that physically connects the electronic device 1001 to the electronic device 1002, e.g., an HDMI connector, a USB connector, an SD card connector, or an audio connector (e.g., a headphone connector).

The haptic module 1079 may convert an electrical signal to a mechanical stimulation (e.g., vibration or movement) or an electrical stimulation perceived by the user through tactile or kinesthetic sensations. The haptic module 1079 may include a motor, a piezoelectric element, or an electric stimulator.

The camera module 1080 may shoot a still image or a video image. The camera module 1080 may include at least one lens, an image sensor, an image signal processor, or a flash.

The power management module 1088 may be a module for managing power supplied to the electronic device 1001 and may serve as at least a part of a power management integrated circuit (PMIC).

The battery 1089 may be a device for supplying power to at least one component of the electronic device 1001 and may include a non-rechargeable (primary) battery, a rechargeable (secondary) battery, or a fuel cell.

The communication module 1090 may establish a wired or wireless communication channel between the electronic device 1001 and t the electronic device 1002, the electronic device 1004, or the server 1008 and support communication execution through the established communication channel. The communication module 1090 may include at least one communication processor operating independently from the processor 1020 (e.g., the application processor) and supporting the wired communication or the wireless communication. The communication module 1090 may include a wireless communication module 1092 (e.g., a cellular communication module, a short-range wireless communication module, or a GNSS (global navigation satellite system) communication module) or a wired communication module 1094 (e.g., an LAN (local area network) communication module or a power line communication module) and may communicate with the external electronic device using a corresponding communication module among them through the first network 1098 (e.g., the short-range communication network such as a Bluetooth, a WiFi (wireless-fidelity) direct, or an IrDA (infrared data association)) or the second network 1099 (e.g., the long-distance wireless communication network such as a cellular network, an internet, or a computer network (e.g., LAN (local area network) or WAN (wide area network))). The above-mentioned various communication modules 1090 may be implemented into one chip, into separate chips, into an SoC (system on chip), or other integrated chip configuration.

The wireless communication module 1092 may identify and authenticate the electronic device 1001 using user information stored in the subscriber identification module 1096 in the communication network.

The antenna module 1097 may include one or more antennas (e.g., one of the previously described antenna configurations) to transmit or receive the signal or power to or from an external source. The communication module 1090 (e.g., the wireless communication module 1092) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

The command or data may be transmitted or received between the electronic device 1001 and the external electronic device 1004 through the server 1008 connected to the second network 1099. Each of the electronic devices 1002 and 1004 may be the same or different types as or from the electronic device 1001. All or some of the operations performed by the electronic device 1001 may be performed by another electronic device or a plurality of external electronic devices. When the electronic device 1001 performs some functions or services automatically or by request, the electronic device 1001 may request the external electronic device to perform at least some of the functions related to the functions or services, in addition to or instead of performing the functions or services by itself. The external electronic device receiving the request may carry out the requested function or the additional function and transmit the result to the electronic device 1001. The electronic device 1001 may provide the requested functions or services based on the received result as is or after additionally processing the received result. To this end, a cloud computing, distributed computing, or client-server computing technology may be used.

Figure 11:
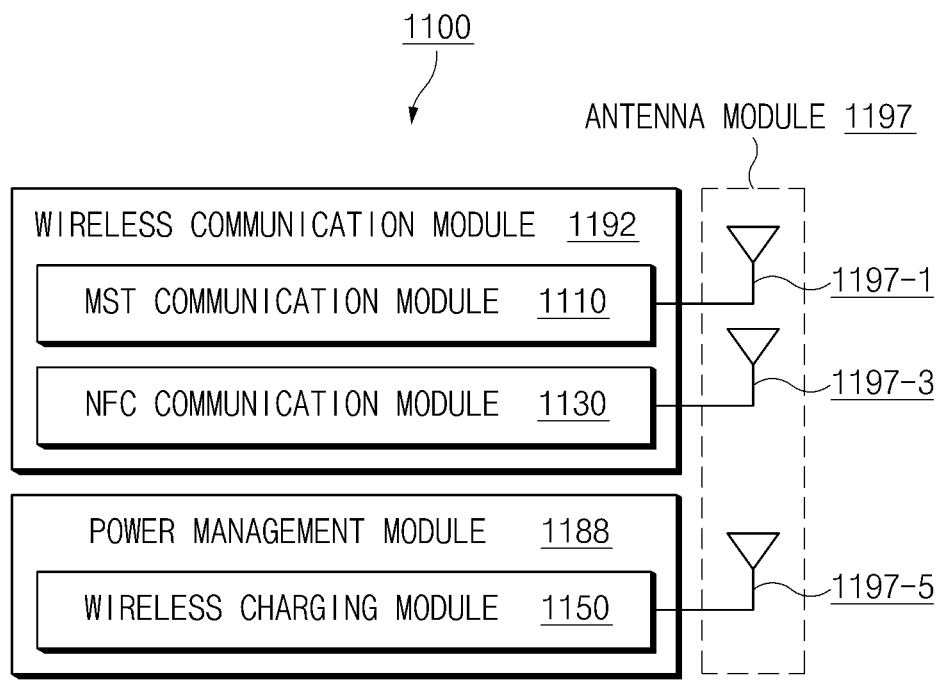
FIG. 11 is a diagram of a wireless communication module, a power management module, and an antenna module of an electronic device, according to an embodiment.

FIG. 11 is a diagram of a wireless communication module, a power management module, and an antenna module of an electronic device, according to an embodiment.

Referring to FIG. 11, the wireless communication module 1092 may include an MST (magnetic secure transmission) communication module 1110 or an NFC (near filed communication) communication module 1130, and the power management module 1088 may include a wireless charging module 1150 An antenna module 1197 may separately include a plurality of antennas including an MST antenna 1197-1 connected with the MST communication module 1110, an NFC antenna 1197-3 connected with the NFC communication module 1130, and a wireless charging antenna 1197-5 connected with the wireless charging module 1150.

The MST communication module 1110 may receive a signal (e.g., a signal including control information or payment information) from the processor 1020, may generate a magnetic signal corresponding to the received signal through the MST antenna 1197-1, and may transmit the generated magnetic signal to the external electronic device 1002 (e.g., a POS device). The MST communication module 1110 may include a switching module including one or more switches connected with the MST antenna 1197-1, and may control the switching module to change a direction of a voltage or a current to be supplied to the MST antenna 1197-1. The magnetic signal transmitted with the direction changed may cause a form and an effect which are similar to those of a magnetic field generated while (or when) a magnetic card is swiped by a card reader of the electronic device 1002. Payment-related information and a control signal received from the electronic device 1002 in the form of the magnetic signal may be transmitted to the server 1008 through the network 1099.

The NFC communication module 1130 may obtain a signal (e.g., control information or payment information) from the processor 1020, and may transmit the obtained signal to the external electronic device 1002 through the NFC antenna 1197-3. The NFC communication module 1130 may receive a signal (e.g., a signal including control information or payment information) transmitted from the external electronic device 1002 through the NFC antenna 1197-3.

The wireless charging module 1150 may wirelessly transmit power to the external electronic device 1002 (e.g., a mobile phone or a wearable device) through the wireless charging antenna 1197-5, or may wirelessly receive power from the external electronic device 1002 (e.g., a wireless charging device). The wireless charging module 1150 may support various wireless charging manners, e.g., including a magnetic resonance manner or a magnetic induction manner.

Some of the MST antenna 1197-1, the NFC antenna 1197-3, or the wireless charging antenna 1197-5 may mutually share at least a portion of a radiation unit (or radiator). For example, a radiation unit of the MST antenna 1197-1 may be used as a radiation unit of the NFC antenna 1197-3 or the wireless charging antenna 1197-5, and vice versa. When the MST antenna 1197-1, the NFC antenna 1197-3, or the wireless charging antenna 1197-5 shares at least a partial region of a radiation unit, the antenna module 1197 may include a switching circuit for selectively connecting or separating (e.g., opening) at least some of the antennas 1197-1, 1197-3, and 1197-3 under control of the wireless communication module 1092 (e.g., the MST communication module 1110 or the NFC communication module 1130) or the power management module 1088 (e.g., the wireless charging module 1150). When the electronic device 1001 uses a wireless charging function, the NFC communication module 1130 or the wireless charging module 1150 may control the switching circuit such that the at least a partial region of the radiation unit shared by the NFC antenna 1197-3 and the wireless charging antenna 1197-5 is temporarily separated from the NFC antenna 1197-3 and is connected only with the wireless charging antenna 1197-5.

At least a part of functions of the MST communication module 1110, the NFC communication module 1130, or the wireless charging module 1150 may be controlled by the processor 1020. Specified functions (e.g., a payment function) of the MST communication module 1110 or the NFC communication module 1130 may be performed in a TEE (trusted execution environment). The TEE may be an execution environment in which at least a portion of a specified region of the memory 1030 is assigned to perform a function (e.g., a financial transaction or a private information related function) needing a relatively high level of security and an access to the specified region is separately and restrictively allowed, e.g., depending on an access subject or an application to be executed.

In accordance with the methods and apparatuses described herein, parasitic current may be reduced by changing a ground point of an antenna, thereby improving the performance of the antennas.

The methods and apparatuses described herein may be implemented by software (e.g., the program 1040) including an instruction stored in a non-transitory machine-readable storage medium (e.g., the internal memory 1036 or the external memory 1038) readable by a machine (e.g., a computer). The machine may be a device that calls the instruction from the non-transitory machine-readable storage medium and operates depending on the called instruction and may include the electronic device (e.g., the electronic device 1001). When the instruction is executed by the processor (e.g., the processor 1020), the processor may perform a function corresponding to the instruction directly or using other components under the control of the processor. The instruction may include a code generated or executed by a compiler or an interpreter. The term non-transitory, as used herein, is a limitation of the medium itself (i.e., tangible, not a signal) as opposed to a limitation on data storage persistency.

The methods described herein may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). With respect to online distribution, at least a portion of the computer program product may be temporarily stored or generated in a storage medium such as a memory of a manufacturer's server, an application store's server, or a relay server.

Each component (e.g., the module or the program) may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
    a housing comprising a first surface, a second surface facing away from the first surface, and a side surface comprising a first edge, a second edge, a third edge, and a fourth edge;
    a support member positioned within the housing and including a first ground region;
    a printed circuit board positioned inside the housing and including a second ground region;
    a first group of switches electrically connecting the first ground region and the second ground region at a first plurality of points;
    a second group of switches electrically connecting the second ground region of the printed circuit board and a conductive material of the second surface of the housing at a second plurality of points;
    a first antenna element including at least a portion of a first edge of the housing and electrically connected with the first ground region of the support member;
    a second antenna element including at least a portion of a second edge of the housing and electrically connected with the second ground region of the printed circuit board; and
    a wireless communication circuit positioned within the housing and configured to:
    transmit/receive a signal in a first frequency band based on a first electrical path formed through the first antenna element,
    transmit/receive a signal in a second frequency band based on a second electrical path formed through the second antenna element,
    set ON/OFF states of the first group of switches to a first arrangement while the signal in the first frequency band is transmitted/received,
    set the ON/OFF states of the first group of switches to a second arrangement while the signal in the second frequency band is transmitted/received,
    set ON/OFF states of the second group of switches to a third arrangement while the signal in the first frequency band is transmitted/received, and
    set the ON/OFF states of the second group of switches to a fourth arrangement while the signal in the second frequency band is transmitted/received,
    wherein at least one switch of the group of switches is set to an ON state in each of the first arrangement and the second arrangement, and at least one switch of the second group of switches is set to an ON state in each of the third arrangement and the fourth arrangement.

2. The electronic device of claim 1, wherein the support member one of forms a portion of a side surface of the housing and is connected to the side surface of the housing.

3. The electronic device of claim 1, wherein the wireless communication circuit is further configured to set the ON/OFF states of the plurality of switches to a third arrangement based on a user input.

4. The electronic device of claim 1, wherein the wireless communication circuit is further configured to set the ON/OFF states of the plurality of switches to a third arrangement based on whether an external device is connected to the electronic device.

5. The electronic device of claim 1, wherein the wireless communication circuit sets the plurality of switches to the ON state while the signal of the first frequency band and the signal of the second band are not transmitted/received.

6. The electronic device of claim 1, wherein the printed circuit board includes a plurality of layers, and wherein the second ground region corresponds to any one of the plurality of layers.

7. An electronic device comprising:
    a housing comprising a first surface, a second surface facing away from the first surface, and a side surface comprising a first edge, a second edge, a third edge, and a fourth edge;
    a support member positioned within the housing and including a first ground region;
    a printed circuit board positioned inside the housing and including a second ground region;
    a first group of switches electrically connecting the first ground region and the second ground region at a first plurality of points;
    a first antenna element including at least a portion of a first edge of the housing and electrically connected with the first ground region of the support member;
    a second group of switches electrically connecting the second ground region of the printed circuit board and a conductive material of the second surface of the housing at a second plurality of points;
    a second antenna element including at least a portion of a second edge of the housing and electrically connected with the second ground region of the printed circuit board; and
    a wireless communication circuit positioned within the housing and configured to:
    transmit/receive a signal in a first frequency band based on at least one of a first electrical path formed through the first antenna element and a second electrical path formed through the second antenna element,
    set ON/OFF states of the first group of switches to a first arrangement while the signal in the first frequency band is transmitted/received,
    set the ON/OFF states of the second group of switches to a second arrangement for the purpose of transmitting/receiving a signal in the second frequency band,
    set ON/OFF states of the second group of switches to a third arrangement while the signal in the first frequency band is transmitted/received,
    set the ON/OFF states of the second group of switches to a fourth arrangement while the signal in the second frequency band is transmitted/received, and
    transmit/receive the signal in the second frequency band based on at least one of the first electrical path and the second electrical path when the ON/OFF states of the first group of switches are set to the second arrangement,
    wherein at least one switch of the first group of switches is set to an ON state in each of the first arrangement and the second arrangement, and at least one switch of the second group of switches is set to the ON state in each of the third arrangement and the fourth arrangement.

8. The electronic device of claim 7, wherein the wireless communication circuit transmits/receives the signal of the first frequency band based on the first electrical path and transmits/receives the signal of the second frequency band based on the second electrical path.

9. The electronic device of claim 7, further comprising:
a cover glass positioned on a first surface of the housing; and
a rear cover positioned on a second surface of the housing.

10. An electronic device comprising:
a housing comprising a first surface, a second surface facing away from the first surface, and a side surface, wherein the side surface comprises a first edge, a second edge, a third edge, and a fourth edge;
a support member positioned within the housing and including a first ground region;
a printed circuit board positioned inside the housing and including a second ground region;
a first group of switches electrically connecting the first ground region and the second ground region at a first plurality of points;
a second group of switches electrically connecting the second ground region of the printed circuit board and a conductive material of the second surface of the housing at a second plurality of points;
a first antenna element including at least a portion of a first edge of the housing and electrically connected with the first ground region of the support member;
a second antenna element including at least a portion of a second edge of the housing and electrically connected with the second ground region of the printed circuit board; and
a wireless communication circuit positioned within the housing and configured to:
transmit/receive a signal in a first frequency band based on a first electrical path formed through the first antenna element, and
transmit/receive a signal in a second frequency band based on a second electrical path formed through the second antenna element.

11. The electronic device of claim 10,
wherein the support member forms a portion of a side surface of the housing and is connected to the side surface of the housing.

12. The electronic device of claim 10,
wherein the wireless communication circuit is further configured to set ON/OFF states of the first group of switches and ON/OFF states of the second group of switches to a specific arrangement based on a frequency band of the transmitted/received signal.

13. The electronic device of claim 10,
wherein the printed circuit board includes a plurality of layers, and
wherein the second ground region corresponds to one of the plurality of layers.

14. The electronic device of claim 10, further comprising:
a cover glass positioned on the first surface of the housing; and
a rear cover positioned on the second surface of the housing.

15. The electronic device of claim 10
wherein the wireless communication circuit is further configured to set ON/OFF states of the plurality of switches based on a user input.

16. The electronic device of claim 10,
wherein the wireless communication circuit is further configured to set ON/OFF states of the plurality of switches based on whether an external device is connected to the electronic device.

* * * * *